(12) United States Patent
Nakamura

(10) Patent No.: US 12,175,717 B2
(45) Date of Patent: Dec. 24, 2024

(54) INFORMATION PROCESSING APPARATUS AND INFORMATION PROCESSING METHOD

(71) Applicant: SONY SEMICONDUCTOR SOLUTIONS CORPORATION, Kanagawa (JP)

(72) Inventor: Kazuo Nakamura, Kanagawa (JP)

(73) Assignee: SONY SEMICONDUCTOR SOLLUTIONS CORPORATION, Kanagawa (JP)

(*) Notice: Subject to any disclaimer, the term of this patent is extended or adjusted under 35 U.S.C. 154(b) by 599 days.

(21) Appl. No.: 17/424,313

(22) PCT Filed: Jan. 9, 2020

(86) PCT No.: PCT/JP2020/000378
§ 371 (c)(1),
(2) Date: Jul. 20, 2021

(87) PCT Pub. No.: WO2020/158326
PCT Pub. Date: Aug. 6, 2020

(65) Prior Publication Data
US 2022/0157037 A1   May 19, 2022

(30) Foreign Application Priority Data

Jan. 29, 2019  (JP) ................. 2019-012916

(51) Int. Cl.
*G06V 10/10* (2022.01)
*G06T 11/60* (2006.01)
*G06V 10/22* (2022.01)

(52) U.S. Cl.
CPC .............. *G06V 10/16* (2022.01); *G06T 11/60* (2013.01); *G06V 10/235* (2022.01)

(58) Field of Classification Search
CPC ....... G06V 10/16; G06V 10/235; G06T 11/60
(Continued)

(56) References Cited

U.S. PATENT DOCUMENTS

2010/0054556 A1   3/2010   Novatzky et al.
2012/0120099 A1   5/2012   Ishizuka

FOREIGN PATENT DOCUMENTS

CN    103197856 A    7/2013
CN    105100583 A    11/2015
(Continued)

OTHER PUBLICATIONS

Adobe Photoshop CS3 User Guide, Chapter 10; copyright 2007 (Year: 2007).*

(Continued)

*Primary Examiner* — Mark Roz
(74) *Attorney, Agent, or Firm* — CHIP LAW GROUP

(57) ABSTRACT

An image display apparatus according to an embodiment of the present technology includes a display control unit and a processing executing unit. The display control unit controls display of a designation image capable of designating a region with respect to a target image. The processing executing unit executes processing associated with the designation image on a designated region designated by the designation image. The processing executing unit executes, on an overlap region in which a first designated region designated by a first designation image and a second designated region designated by a second designation image overlap with each other, first processing associated with the first designation image and second processing associated with the second designation image. The display control unit moves the second designation image in conjunction with movement of the first designation image when the overlap region exists.

19 Claims, 18 Drawing Sheets

(58) Field of Classification Search
USPC ........................................................ 382/284
See application file for complete search history.

(56) References Cited

FOREIGN PATENT DOCUMENTS

| JP | 07-57111 A | 3/1995 |
| JP | 2001-297018 A | 10/2001 |
| JP | 2010152114 A | 7/2010 |
| JP | 2012063834 A | 3/2012 |

OTHER PUBLICATIONS

International Search Report and Written Opinion of PCT Application No. PCT/JP2020/000378, issued on Feb. 25, 2020, 08 pages of ISRWO.

\* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/000378 filed on Jan. 9, 2020, which claims priority benefit of Japanese Patent Application No. JP 2019-012916 filed in the Japan Patent Office on Jan. 29, 2019. Each of the above-referenced applications is hereby incorporated herein by reference in its entirety.

TECHNICAL FIELD

The present technology relates to an information processing apparatus, an information processing method, and a program that are applicable to image processing such as image analysis.

BACKGROUND ART

In the image processing system described in Patent Literature 1, as shown in FIGS. 13A and 13B thereof, virtual lens objects capable of image processing or the like are supplied. Due to characteristics of optical lenses, such as color filters, defined in the virtual lens objects, a part of an image is changed. When these virtual lens objects are superimposed, various types of image processing are performed. Thus, simplification of the processing operation and improvement of the usability are attempted (paragraphs [0014] and [0023] of the specification, FIGS. 14A, 14B, 18A, 18B, and the like of Patent Literature 1).

CITATION LIST

Patent Literature

Patent Literature 1: Japanese Patent Application Laid-open No. Hei 07-57111

DISCLOSURE OF INVENTION

Technical Problem

There is a demand for a technique capable of exhibiting high usability in execution of such image processing such as image analysis.

In view of the above circumstances, it is an object of the present technology to provide an information processing apparatus, an information processing method, and a program that are capable of exhibiting high usability in execution of image processing.

Solution to Problem

In order to achieve the above object, an information processing apparatus according to an embodiment of the present technology includes a display control unit and a processing executing unit.

The display control unit controls display of a designation image capable of designating a region with respect to a target image.

The processing executing unit executes processing associated with the designation image on a designated region designated by the designation image.

The processing executing unit executes, on an overlap region in which a first designated region designated by a first designation image and a second designated region designated by a second designation image overlap with each other, first processing associated with the first designation image and second processing associated with the second designation image.

The display control unit moves the second designation image in conjunction with movement of the first designation image when the overlap region exists.

In this information processing apparatus, the processing associated with each designation image is executed on an overlap region in which a first designated region designated by a first designation image capable of designating a region with respect to a target image and a second designated region designated by a second designation image capable of designating a region with respect to the target image overlap with each other. When the overlap region exists, the second designation image is moved in conjunction with the movement of the first designation image. This makes it possible to exhibit high usability.

The display control unit may move the second designation image in conjunction with the movement of the first designation image when an entirety of the second designated region is the overlap region.

The display control unit may move the second designation image in conjunction with the movement of the first designation image while maintaining a positional relationship between the first designation image and the second designation image.

The display control unit may simultaneously move the first designated region image and the second designated region image when an entirety of the first designated region and an entirety of the second designated region are the overlap regions.

The display control unit may move the second designated region image independently of the first designated region image except when an entirety of the first designated region and an entirety of the second designated region are the overlap regions.

The information processing apparatus may further include a receiving unit that receives an instruction of a user. In this case, the display control unit may synthesize, on the basis of the received instruction of the user, the first designation image and the second designation image such that an entirety of the first designated region and an entirety of the second designated region are the overlap regions, and control display of the synthesized first designation image and second designation image as a synthesized designation image that designates the overlap region and is associated with the first processing and the second processing.

The display control unit may display, on the basis of the received instruction of the user, information indicating a position of the designation image with respect to the target image.

The information indicating the position of the designation image with respect to the target image may be an entire image of the target image displayed with reference to the position of the designation image.

The processing executing unit may execute the first processing by using data related to the overlap region as an input, and execute the second processing by using a result of the first processing as an input.

The processing executing unit may execute each of the first processing and the second processing by using data related to the overlap region as an input.

The display control unit may display, when execution of the second processing using a result of the first processing as an input is impossible, information indicating that the execution of the second processing is impossible.

The display control unit may cancel, when execution of the second processing using a result of the first processing as an input is impossible, linkage of movement of the second designation image with the movement of the first designation image.

The display control unit may display a processing result image based on the processing associated with the designation image on the designated region.

The processing associated with the designation image may include at least one of output of image data of the designated region, image processing for the designated region, or analysis processing for the designated region.

The processing result image may include at least one of an image of the designated region, an image of the designated region after the image processing, or an image including a result of the analysis processing.

The processing result image corresponding to the synthesized designation image may be the processing result image based on the second processing associated with the synthesized designation image.

The display control unit may display a copied image that is an image in which the processing result image is copied.

The processing executing unit may execute the processing associated with the designation image on the designated region designated by the designation image, using the copied image as the target image.

An information processing method according to an embodiment of the present technology is an information processing method executed by a computer system, the method including: executing first processing and second processing on an overlap region in which a first designated region and a second designated region overlap with each other, the first designated region being designated by a first designation image capable of designating a region with respect to a target image, the second designated region being designated by a second designation image capable of designating a region with respect to the target image, the first processing being associated with the first designation image, the second processing being associated with the second designation image; and controlling, when the overlap region exists, display of the first designation image and the second designation image such that the second designation image is moved in conjunction with movement of the first designation image.

A program according to an embodiment of the present technology is a program causing a computer system to execute the steps of: executing first processing and second processing on an overlap region in which a first designated region and a second designated region overlap with each other, the first designated region being designated by a first designation image capable of designating a region with respect to a target image, the second designated region being designated by a second designation image capable of designating a region with respect to the target image, the first processing being associated with the first designation image, the second processing being associated with the second designation image; and controlling, when the overlap region exists, display of the first designation image and the second designation image such that the second designation image is moved in conjunction with movement of the first designation image.

MODE(S) FOR CARRYING OUT THE INVENTION

Embodiments according to the present technology will now be described below with reference to the drawings.

[Configuration of Image Processing System]

Figure 1:
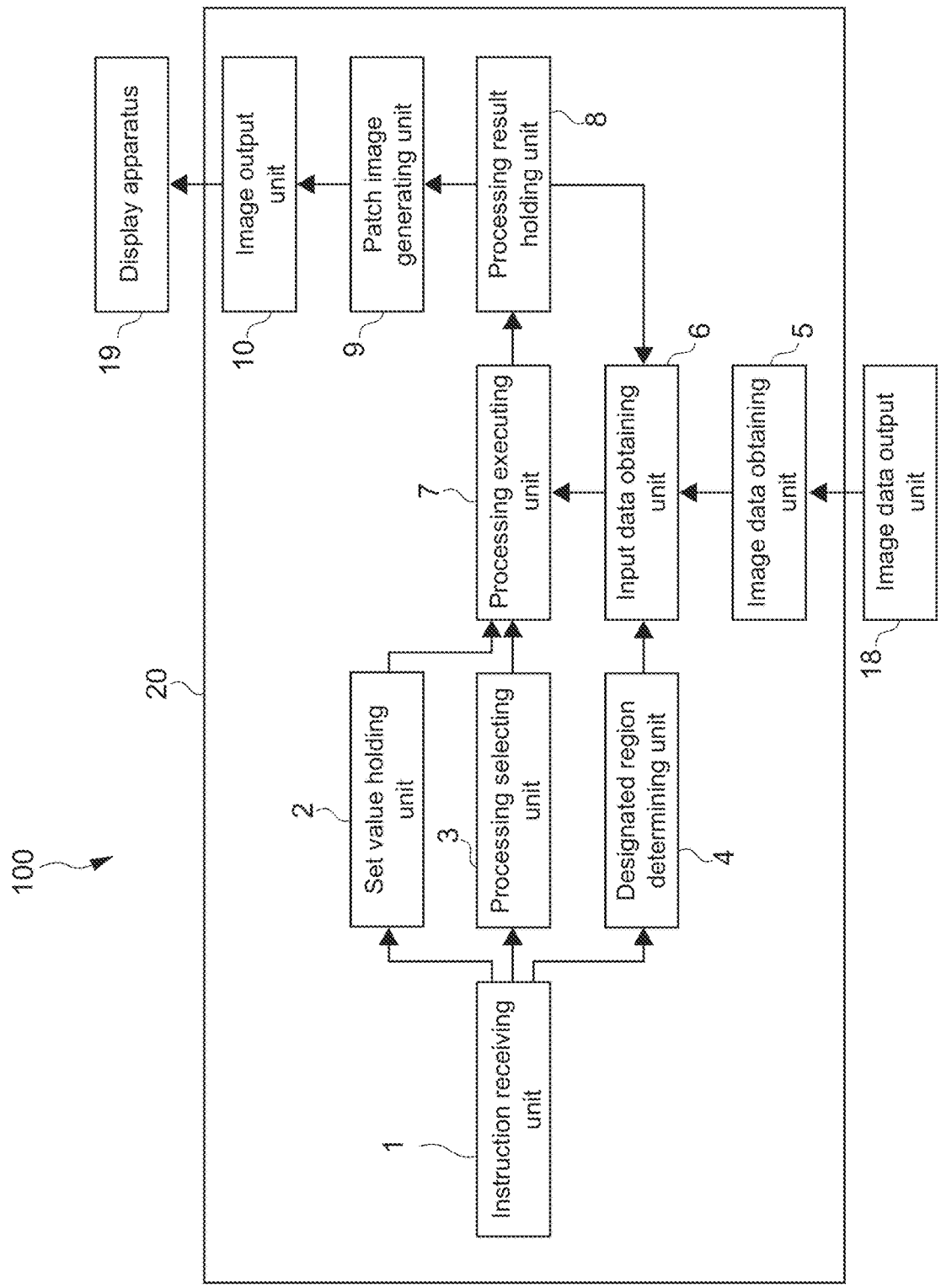
FIG. 1 is a block diagram showing a configuration example of an image processing system according to an embodiment of the present technology.
Figure 2:
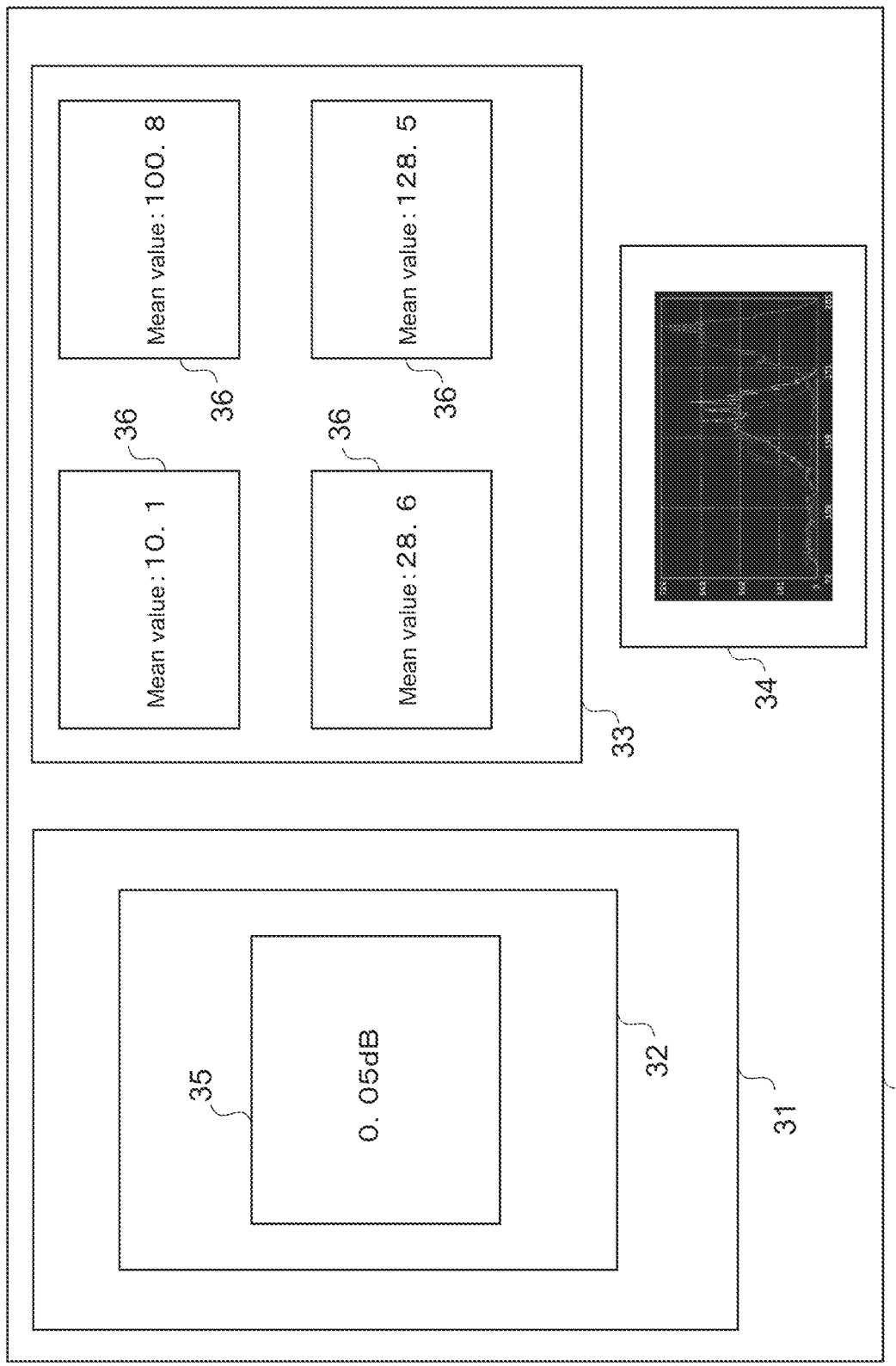
FIG. 2 is a schematic diagram showing an example of a GUI that can be operated by a user using the image processing system.

FIG. 1 is a block diagram showing a configuration example of an image processing system 100 according to an embodiment of the present technology. FIG. 2 is a schematic diagram showing an example of a graphical user interface (GUI) that can be operated by a user using the image processing system 100.

The image processing system 100 includes an image data output apparatus 18, a display apparatus 19, and an image processing apparatus 20.

The image data output apparatus 18 outputs image data. For example, image data such as a photograph showing a specific scene or person is output. In addition, any image data may be output. Hereinafter, in order to simplify the description, the image data may be simply referred to as an image. For example, description such as "an image output from the image data output apparatus 18" may be given.

In the present disclosure, the image includes a still image and a moving image. Of course, the image also includes a plurality of frame images included in the moving image. The specific configuration of the image data output apparatus 18 is not limited, and any apparatus may be used. Further, the format of the image data and the like are also not limited, and any format and the like may be adopted. Further, any codec technology or the like may be used (note that the description of the encoding and decoding of the image will be omitted).

The display apparatus 19 is capable of displaying various images and various GUIs. The specific configuration of the display apparatus 19 is not limited, and any display apparatus using, for example, liquid crystal, electro-luminescence (EL), or the like may be used.

The image processing apparatus 20 is capable of executing various types of processing on the image output by the image data output apparatus 18. Further, the image processing apparatus 20 is capable of controlling image display by the display apparatus 18.

For example, the image processing apparatus 20 is capable of directly displaying the image obtained from the image data output apparatus 18 on the display apparatus 19. Further, the image processing apparatus 20 is capable of displaying the result of the image processing performed on the image on the display apparatus 19. Further, the image processing apparatus 20 is capable of displaying a GUI or the like generated or held by the image processing apparatus 20 itself on the display apparatus 19.

As shown in FIG. 2, in this embodiment, various image processing patches (hereinafter simply referred to as patches) are generated by the image processing apparatus 20 and displayed on the display apparatus 19. The user can execute various types of processing using various patches displayed on the display apparatus 19. In this embodiment, the image processing apparatus 20 corresponds to an information processing apparatus.

The patch can designate a region within an image. In this embodiment, the patch is formed using a rectangular frame, and a region surrounded by the frame is a designated region designated by the patch. The user can change the position, shape (aspect ratio), and size of the patch. Therefore, the user can change the position, shape (aspect ratio), and size of the designated region by, for example, moving the patch. That is, in the image processing system 100, the position and size of a designation image can be changed on the basis of an instruction of the user. Of course, it is also possible to rotate the patch.

In this embodiment, the patch functions as a designation image. The designation image is not limited to a rectangular frame, and any image capable of designating a region with respect to a target image can be adopted as a designation image. Further, an image whose region is to be designated by a patch is a target image. As will be described later, not only an image output from the image data output apparatus 18 but also an image obtained after predetermined image processing is performed by the image processing apparatus 20, for example, can be included in the target image according to the present technology.

Further, the image processing apparatus 20 is capable of executing processing associated with the patch on the designated region designated by the patch. In the example shown in FIG. 2, an image input patch 30, a noise removal patch 31, an edge enhancement patch 32, a low-pass filter patch 33, a histogram analysis patch 34, an S/N analysis patch 35, and statistical analysis patches 36 are displayed as examples of patches. Each patch will be described in detail later.

The image processing apparatus 20 can be implemented by any computer including hardware such as a CPU (processor), a ROM, a RAM, and an HDD. For example, an information processing method according to the present technology is executed by, for example, the CPU loading a program according to the present technology, which is recorded in advance in the ROM or the like, into the RAM and executing the program.

The image processing apparatus 20 can be implemented by any computer such as a personal computer (PC). It is needless to say that any hardware such as a GPU, a FPGA, or ASIC may be used to implement the image processing apparatus 20.

The program is installed in, for example, a PC, a smart phone, or the like via various recording media. Alternatively, the program may be installed via, for example, the Internet.

Note that the type or the like of the recording medium on which the program is recorded is not limited, and any computer-readable recording medium may be used. For example, any recording medium that records data in a non-transitory manner may be used.

As shown in FIG. 1, in this embodiment, the CPU or the like of the image processing apparatus 20 executes a predetermined program, thereby implementing an instruction receiving unit 1, a set value holding unit 2, a processing selecting unit 3, a designated region determining unit 4, an image data obtaining unit 5, an input data obtaining unit 6, a processing executing unit 7, a processing result holding unit 8, a patch image generating unit 9, and an image output unit 10 as functional blocks. In order to implement each block, dedicated hardware such as an integrated circuit (IC) may be used.

The instruction receiving unit 1 receives an instruction of the user. For example, a keyboard, a pointing device, a touch panel, or any other operation device is connected to or installed in the image processing apparatus 20 (not shown). When a signal corresponding to an operation of the operation device by the user is received, an instruction of the user is received.

For example, it is possible to receive an instruction of the user through various operations such as clicking of a mouse button and long-pressing of a mouse button. Of course, the present technology is not limited to the operation of the operation device, and an instruction of the user may be input by voice input or gesture input. In this embodiment, the instruction receiving unit 1 corresponds to a receiving unit that receives an instruction of the user.

The set value holding unit 2 controls and holds a set value related to the processing associated with the patch on the basis of the received instruction of the user. For example, it is possible to set image input, noise removal, edge enhancement, low-pass filtering, histogram analysis, and the like as the processing associated with the patch. The set value holding unit 2 controls and holds the set values related to these types of processing.

The processing selecting unit 3 selects processing to be executed on the target image on the basis of the instruction of the user. In this embodiment, the processing associated with a selected patch is selected on the basis of a selection instruction of the patch by the user. The method of selecting a patch by the user, the GUI used for selecting a patch, and the like are not limited, and may be arbitrarily set.

The designated region determining unit 4 determines a designated region designated by the patch on the basis of an instruction of the position, shape, and size of the patch by the user. For example, it is possible to determine a designated region on the basis of the position information of each pixel of the target image, the position information of each pixel constituting the frame of the patch, and the like. In addition, any method capable of determining a designated region may be used.

The image data obtaining unit 5 obtains the image data output by the image data output unit 18. For example, an image for which execution of processing is desired is designated by the user. The image data obtaining unit 5 obtains the designated image data from the image data output unit 18. Of course, the method is not limited to such a method.

The input data obtaining unit 6 obtains input data when the processing selected by the processing selecting unit 3 is executed. In this embodiment, the input data obtaining unit 6 obtains, as input data, information related to the designated region designated by the patch. As shown in FIG. 1, the input data is obtained on the basis of the image data obtained by the image data obtaining unit 5.

Alternatively, the input data may be obtained on the basis of a processing result of other processing performed on the designated region. In this case, in this embodiment, a processing result of other processing is output from the processing result holding unit 8.

The processing executing unit 7 executes the processing selected by the processing selecting unit 3 on the input data obtained by the input data obtaining unit 6. At this time, the set value held by the set value holding unit 8 is referred to as a processing parameter as appropriate.

The processing result holding unit 8 holds a processing result of the processing executed by the processing executing unit 7. For example, it is possible to set image input, noise removal, edge enhancement, low-pass filtering, histogram analysis, and the like as the processing associated with the patch. The processing result holding unit 8 holds the results of these types of processing.

On the basis of the processing results held by the processing result holding unit 8, the patch image generating unit 9 generates a patch image to be displayed on the designated region designated by the patch. In this embodiment, the patch image corresponds to a processing result image based on the processing associated with the designation image. That is, in the image processing system 100, the processing result image based on the processing associated with the designation image is displayed on the designated region.

The image output unit 10 outputs the patch and the patch image to the display apparatus 19 for display.

In this embodiment, the patch image generating unit 9 and the image output unit 10 function as a display control unit that controls display of a designation image capable of designating a region with respect to a target image. The processing executing unit 7 functions as a processing executing unit that executes processing associated with the designation image on the designated region designated by the designation image.

As will be described below, in this embodiment, various types of information (including images and the like) related to the image processing system are displayed. The display control of these pieces of information is executed by the display control unit including the patch image generating unit 9 and the image output unit 10. That is, the display control unit is not limited to the case having only the functions of the patch image generating unit 9 and the image output unit 10 exemplified in FIG. 1, and can have other display control functions.

[Example of Patch]

Each patch exemplified in FIG. 2 will be described.

The image input patch 30 is associated with processing of inputting the image data corresponding to the designated region designated by the image input patch 30. In this embodiment, the input of image data means the input of image data from the outside into the image processing system 100. The input of image data can also be referred to as processing of obtaining the image data from the outside and outputting the image data to each block in the image processing system 100.

In this embodiment, the image input patch 30 functions as a patch applicable to the image data output by the image data output unit 18. That is, the image input patch 30 is a patch for causing the image output by the image data output unit 18 to function as a target image.

For example, the image input patch 30 is selected by the user and arranged at a desired location on the display apparatus 19. The processing selecting unit 3 selects image input, and the designated region determining unit 4 determines a designated region. The input data obtaining unit 6 obtains, as input data, image data corresponding to the designated region of the target image. The image data corresponding to the designated region of the target image is not limited to the image data of the designated region, but includes the image data of the designated region and its peripheral region, and any data related to the designated region (such as a search target to be described later).

The processing executing unit 7 outputs the image data corresponding to the designated region obtained by the input data obtaining unit 6 as a processing result. Note that, at this time, processing is executed on the image data on the basis of the set value held by the set value holding unit. For example, the brightness and the like are appropriately controlled.

The processing result holding unit 8 holds the image data corresponding to the designated region output by the processing executing unit 7 as a processing result. The patch image generating unit 9 generates an image corresponding to the designated region output by the processing result holding unit 9 as a patch image. The image output unit 10 outputs an image input patch 30 (rectangular frame) and the image corresponding to the designated region, and displays them on the display apparatus 19.

In this embodiment, the noise removal patch 31, the edge enhancement patch 32, and the low-pass filter patch 33 are classified as image processing patches.

The noise removal patch 31 is associated with noise removal for the designated region designated by the noise removal patch 31. A specific algorithm for noise removal is not limited, and any algorithm may be employed.

The noise removal patch 31 functions as a patch applicable to the image data corresponding to the designated region. For example, it is possible to arrange the noise removal patch 31 with the image output by the image data output unit 18 being used as a target image, and execute noise removal on the designated region.

It is also possible to apply the noise removal patch 31 to the image data obtained after other image processing is executed. In this case, the image obtained after other image processing is executed is a target image, and the noise removal is executed on the designated region designated by the noise removal patch 31.

For example, the noise removal patch 31 is selected by the user and arranged at a desired location on the target image. The processing selecting unit 3 selects noise removal, and the designated region determining unit 4 determines a designated region. The input data obtaining unit 6 obtains, as input data, image data corresponding to the designated region of the target image.

For example, when an image output by the image data output unit 18 is used as a target image, input data is obtained from the image data output by the image data output unit 18. When an image obtained after other image processing is executed is used as a target image, input data is obtained from the image data output from the processing result holding unit 8.

The processing executing unit 7 executes noise removal on the image data corresponding to the designated region obtained by the input data obtaining unit 6. The image data obtained after the noise removal is executed is output as a processing result. Note that, at this time, noise removal based on the set value held by the set value holding unit 8 is executed.

The processing result holding unit 8 holds the image data corresponding to the designated region, on which the noise removal has been executed, as a processing result. The patch image generating unit 9 generates image data on which noise removal has been executed as a patch image. The image output unit 10 outputs a noise removal patch 31 (rectangular frame) and the image of the designated region obtained after the noise removal is executed, and displays them on the display apparatus 19.

As described above, in this embodiment, the image obtained after the noise removal is executed is displayed inside the noise removal patch 31. When the position, shape, and size of the noise removal patch 31 are appropriately changed, noise removal can be executed in a desired region, and the processing result can be visually recognized.

The edge enhancement patch 32 is associated with edge enhancement for the designated region designated by the noise removal patch 31. For example, the edges of objects included in the designated region are emphasized. A specific algorithm for edge enhancement is not limited, and any algorithm may be employed.

Similar to the noise removal patch 31, the edge enhancement patch 32 can also be applied to both the image data corresponding to the designated region and the image data obtained after other image processing is executed. That is, it is possible to arrange the edge enhancement patch 32 using the image output by the image data output unit 18 as a target image. In addition, it is also possible to arrange the edge enhancement patch 32 using the image obtained after other image processing is executed as a target image.

As in the case where the noise removal patch 31 is selected, edge enhancement is executed on the designated region designated by the edge enhancement patch 32. The image obtained after the edge enhancement is executed is then displayed as a patch image inside the edge enhancement patch 32. When the position, shape, and size of the edge enhancement patch 32 are appropriately changed, edge enhancement can be executed in a desired region, and the processing result can be visually recognized.

The low-pass filter patch 33 is associated with low-pass filtering for the designated region designated by the low-pass filter patch 33. A specific algorithm for low-pass filtering is not limited, and any algorithm may be employed.

The low-pass filter patch 33 is also applicable to both the image data corresponding to the designated region and the image data obtained after other image processing is executed. That is, it is possible to arrange the low-pass filter patch 33 using the image output by the image data output unit 18 as a target image. It is also possible to arrange the low-pass filter patch 33 using the image obtained after other image processing is executed as a target image.

Low-pass filtering is executed on the designated region designated by the low-pass filter patch 33. The image obtained after the low-pass filtering is executed is then displayed as a patch image inside the low-pass filter patch 33. When the position, shape, and size of the low-pass filter patch 33 are appropriately changed, the low-pass filtering can be executed in a desired region, and the processing result can be visually recognized.

In this embodiment, the histogram analysis patch 34, the S/N analysis patch 35, and the statistical analysis patches 36 are classified as image analysis patches.

The histogram analysis patch 34 is associated with histogram analysis for the designated region designated by the histogram analysis patch 34. A specific algorithm for histogram analysis is not limited, and any algorithm may be employed.

The histogram analysis patch 34 functions as a patch applicable to the image data corresponding to the designated region. For example, it is possible to arrange the histogram analysis patch 34 with the image output by the image data output unit 18 being used as a target image, and execute the histogram analysis patch 34 on the designated region.

It is also possible to apply the histogram analysis patch 34 to the image data obtained after other image processing is executed. In this case, the image obtained after other image processing is executed is a target image, and the histogram analysis patch 34 is executed on the designated region designated by the histogram analysis patch 34.

For example, the histogram analysis patch 34 is selected by the user and arranged at a desired position on the target image. The processing selecting unit 3 selects histogram analysis, and the designated region determining unit 4 determines a designated region. The input data obtaining unit 6 obtains, as input data, image data corresponding to the designated region of the target image.

For example, when an image output by the image data output unit 18 is used as a target image, input data is obtained from the image data output by the image data output unit 18. When an image obtained after other image processing is executed is used as a target image, input data is obtained from the image data output from the processing result holding unit 8.

The processing executing unit 7 executes histogram analysis on the image data corresponding to the designated region obtained by the input data obtaining unit 6. The result of the histogram analysis is output as a processing result. Note that, at this time, histogram analysis based on the set value held by the set value holding unit 2 is executed.

The processing result holding unit 8 holds the result of the histogram analysis as a processing result. The patch image generating unit 9 generates an image representing the result of the histogram analysis as a patch image. In the example shown in FIG. 2, a thumbnail of the histogram is generated as a patch image. The image output unit 10 outputs a histogram analysis patch 34 (rectangular frame) and the thumbnail of the histogram, and displays them on the display apparatus 19.

As described above, in this embodiment, the thumbnail of the histogram analysis result is displayed inside the histogram analysis patch 34. When the position, shape, and size of the histogram analysis patch 34 are appropriately changed, histogram analysis can be executed in a desired region, and the processing result can be visually recognized.
Usability The S/N analysis patch 35 is associated with S/N analysis for the designated region designated by the S/N analysis patch 35. A specific algorithm for S/N analysis is not limited, and any algorithm may be employed.

Similar to the histogram analysis patch 34, the S/N analysis patch 35 can also be applied to both the image data corresponding to the designated region and the image data obtained after other image processing is executed. That is, it is possible to arrange the S/N analysis patch 35 with the image output by the image data output unit 18 being used as a target image. It is also possible to arrange the S/N analysis patch 35 with the image obtained after other image processing is executed being used as a target image.

As in the case where the histogram analysis patch 34 is selected, the S/N analysis patch 35 is executed on the designated region designated by the S/N analysis patch 35. The image representing the result of the S/N analysis is then generated as a patch image inside the S/N analysis patch 35. In the example shown in FIG. 2, a text image of a decibel value is generated as a patch image. When the position, shape, and size of the S/N analysis patch 35 are appropriately changed, S/N analysis can be performed in a desired region, and the processing result can be visually recognized.

The statistical analysis patch 36 is associated with statistical analysis for the designated region designated by the statistical analysis patch 36. A specific algorithm for statistical analysis is not limited, and any algorithm may be employed.

The statistical analysis patch 36 is also applicable to both the image data corresponding to the designated region and the image data obtained after other image processing is executed. That is, it is possible to arrange the statistical analysis patch 36 using the image output from the image data output unit 18 as a target image. It is also possible to arrange the statistical analysis patch 36 using the image after the other image processing is executed as a target image.

Statistical analysis is executed on the designated region designated by the statistical analysis patch 36. The image representing the result of the statistical analysis is then displayed as a patch image inside the statistical analysis patch 36. In the example shown in FIG. 2, a text image of a mean value of predetermined parameters is displayed as a patch image. When the position, shape, and size of the statistical analysis patch 36 are appropriately changed, the statistical analysis can be executed in a desired region, and the processing result can be visually recognized.

As described above, it is possible to set the input of the image data of the designated region (output to each block), the image processing for the designated region, and the analysis processing for the designated region as the processing associated with the patch that is the designation image. It is possible to display, as a patch image that is a processing result image, an image of the designated region, an image of the designated region obtained after image processing, and an image including an analysis result.

Specific details of the processing associated with the image processing patch are not limited, and any image processing can be associated with the patch. As in the case of the image analysis patch, any analysis processing can be associated with the patch.

When the result of other processing is input, the result of the other processing may not be adapted as the input data. Typically, image processing cannot be performed using the result of image analysis as an input. Depending on the details of the processing, the result of predetermined image processing may not be adapted as an input of other image processing. Further, the result of predetermined image processing may not be adapted as an input of other analysis processing.

As described above, it is possible to set at least one of the output of the image data of the designated region, the image processing for the designated region, or the analysis processing for the designated region as the processing associated with the designation image. Further, it is possible to display, as a processing result image, at least one of an image of the designated region, an image of the designated region obtained after the image processing, or an image including the result of the analysis processing.

[Pipeline Configuration of Patch]

The patches can be arranged such that the designated regions thereof overlap with each other. A patch image based on the processing associated with the patch is displayed in the designated region designated by the patch. Other patches can be superimposed on the patch image displayed in the designated region.

Hereinafter, the overlapping of the designated regions may be referred to as the overlapping of the patches. Further, it is assumed that there is a mutually overlapping region between a designated region A designated by a patch A and a designated region B designated by a patch B. In this case, it may be described that an overlap region exists between the patch A and the patch B.

In addition, when the entire designated region B of the patch B is included in the designated region A of the patch A, it may be described that the patch B is arranged on the patch A. When the patch B is arranged on the patch A, it can be said that the entire designated region of the patch B is the overlap region.

It is also possible to completely overlap the patch A and the patch B. That is, it is also possible to arrange the patch A and the patch B such that the position, shape, and size of the designated region A and the position, shape, and size of the designated region B coincide with each other. This state can also be said to be a state in which the entire designated region A and the entire designated region B are overlap regions.

In the example shown in FIG. 2, other patches are arranged on the image input patch 30. The edge enhancement patch 32 is arranged on the noise removal patch 31. The S/N analysis patch 35 is arranged on the edge enhancement patch 32.

In the designated region designated by the S/N analysis patch 35, a plurality of types of processing of image input, noise removal, edge enhancement patch, and S/N analysis is successively executed. In this manner, the patches are arranged so as to overlap with each other, and thus it is possible to easily implement a pipeline of processing for an image.

In this embodiment, when the patch B is arranged on the patch A (when the entire designated region B is included in the designated region A), the patch A is set as a parent patch, and the patch B is set as a child patch. Then, the processing of the patch B is executed using the processing result of the patch A as an input. It can also be said that the relationship between the parent and the child is determined by the sizes of the designated region A and the designated region B.

For example, focusing on the pipeline up to the S/N analysis patch 35, the relationship between the parent and the child is as follows.

(Parent patch): (Child patch)

Image input patch 30: Noise removal patch 31

Noise removal patch 31: Edge enhancement patch 32

Edge Enhancement Patch 32: S/N analysis patch 35

In this manner, the patch including its own designated region is the parent patch. A patch in which the whole of the established region is included in its own designated region is the child patch.

Note that, for the noise removal patch 31, an image input by the image input patch 30 is the target image. For the edge enhancement patch 32, an image obtained after the noise removal of the noise removal patch 31 is executed is the target image. For the S/N analysis patch 35, an image obtained after the edge enhancement of the edge enhancement patch 32 is executed is the target image.

In the region designated by the histogram analysis patch 34, a pipeline of image input and histogram analysis is implemented. For the histogram analysis patch 34, the image input patch 30 is the parent patch. For the image input patch 30, the histogram analysis patch 34 is the child patch.

That is, in the region where each patch overlaps, the processing of the patch overlapping with the parent patch is executed using the image data output from the parent patch as an input, and the processing of the patch arranged on the overlapping patch is executed using the result of the processing of the overlapping patch as an input. Note that, in this embodiment, the image data output from the parent patch corresponds to data related to the overlap region.

Four statistical analysis patches 36 are arranged on the low-pass filter patch 33. In the designated region of each statistical analysis patch 36, a pipeline of image input, low-pass filtering, and statistical analysis is implemented. In this manner, it is also possible to perform statistical analysis on a plurality of regions and compare the results.

For the four statistical analysis patches 36, the low-pass filter patch 33 is the parent patch. For the low-pass filter patch 33, the four statistical analysis patches 36 are child patches.

The parent patch, the designated region of the parent patch, and the processing associated with the parent patch correspond to an embodiment of the first designation image, the first designated region, and the first processing. The child patch, the designated region of the child patch, and the processing associated with the child patch correspond to an embodiment of the second designation image, the second designated region, and the second processing. Of course, the present technology is not limited to the above.

Figure 3:
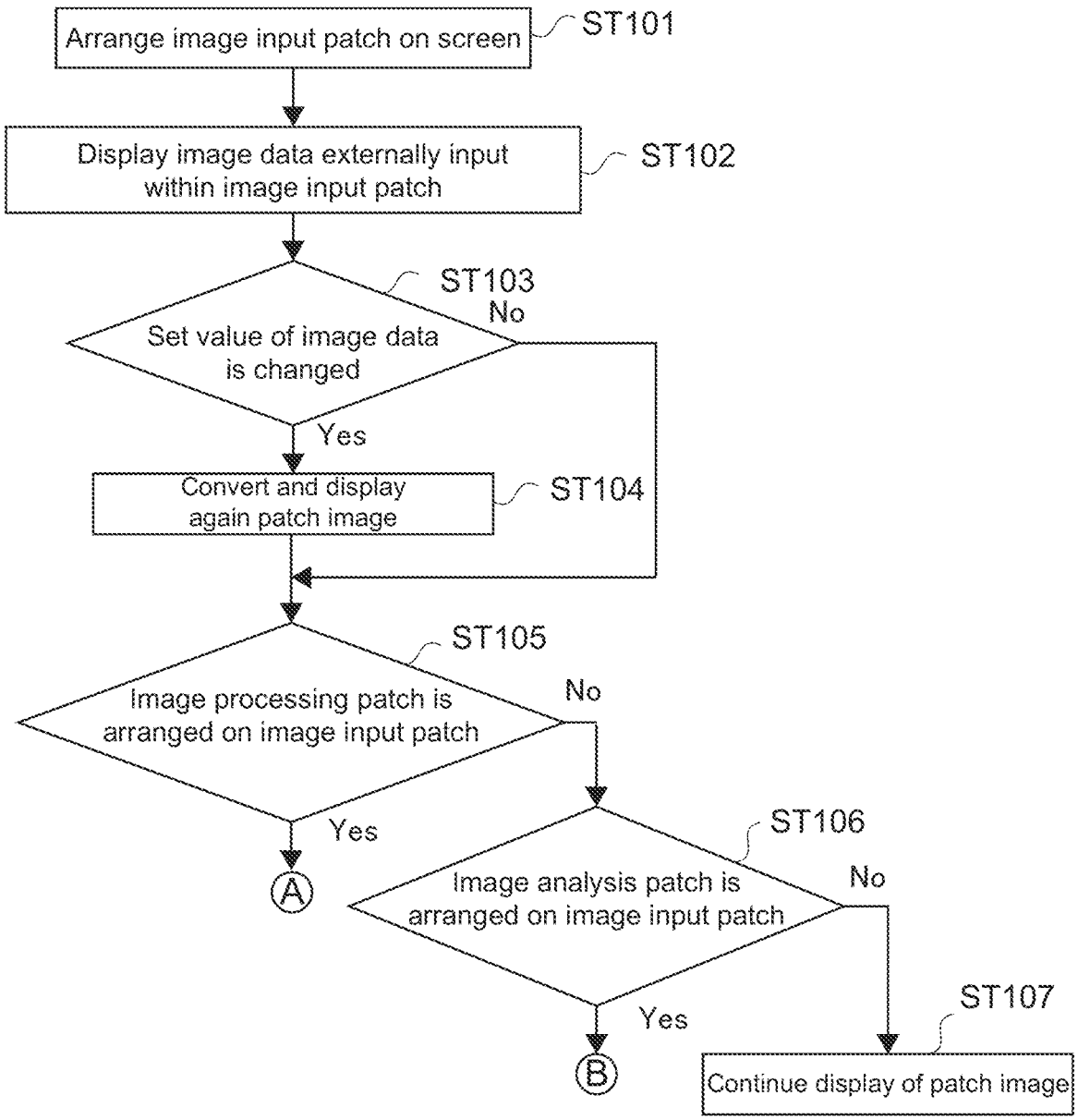
FIG. 3 is a flowchart showing an example of processing using a patch.
Figure 4:
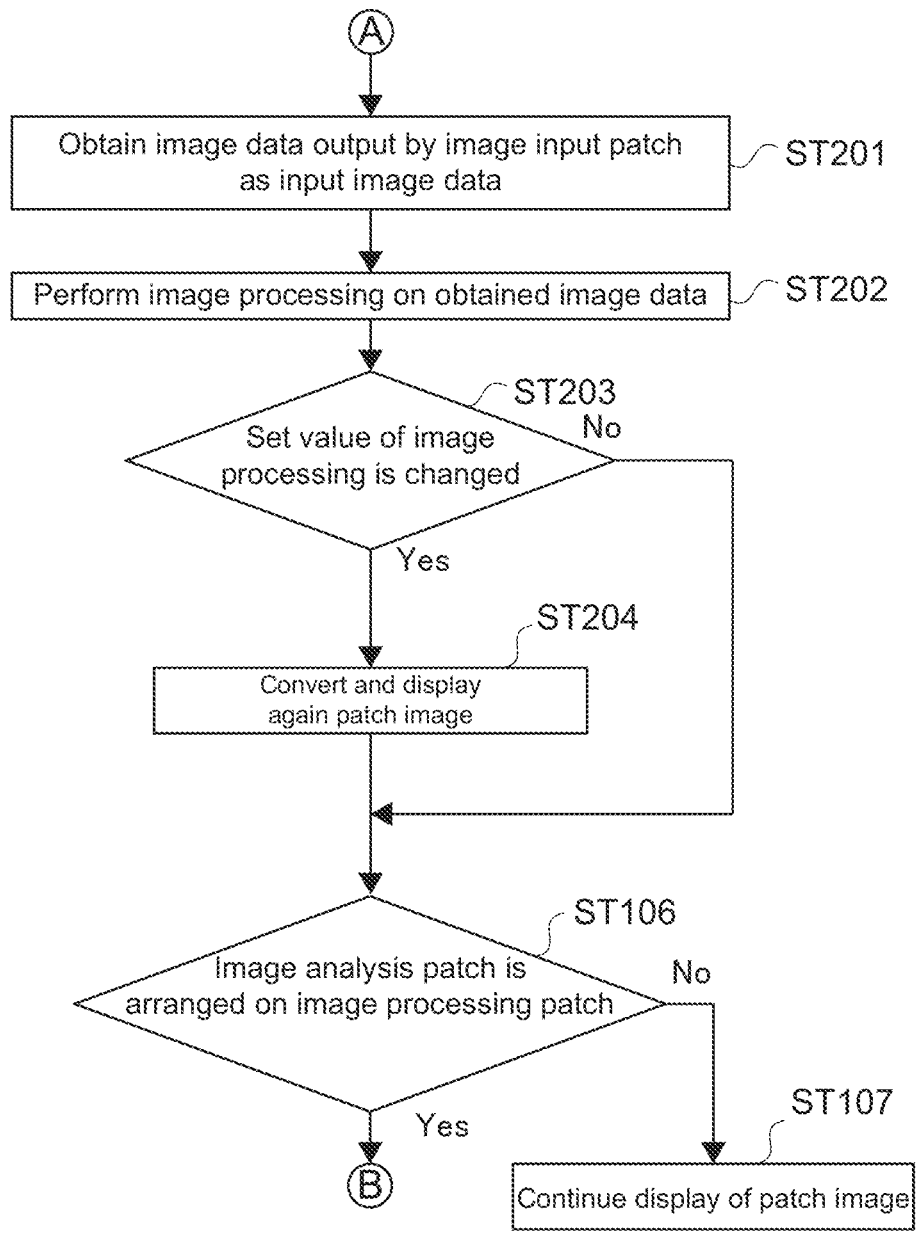
FIG. 4 is a flowchart showing an example of processing using a patch.
Figure 5:
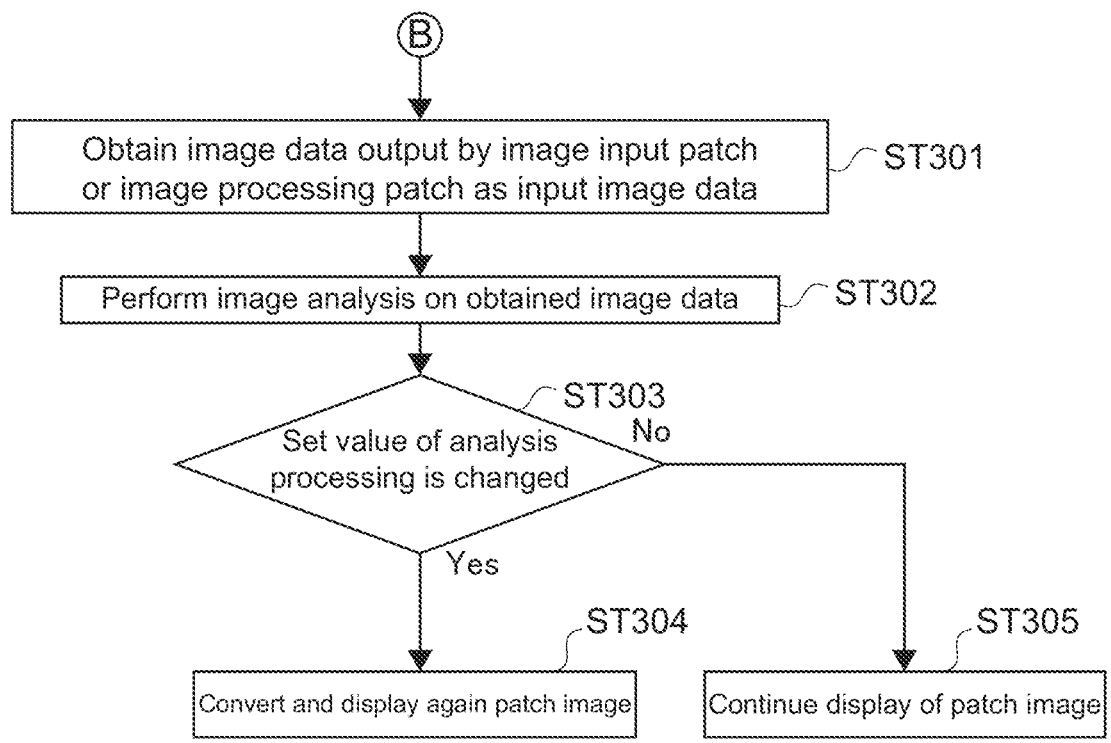
FIG. 5 is a flowchart showing an example of processing using a patch.

FIGS. 3 to 5 are flowcharts showing an example of processing using the patches. The image input patch 30 is arranged on the screen of the display apparatus 19 (Step 101). In the image input patch 30, an image corresponding to a designated region is displayed as a patch image. The patch image is generated on the basis of the image data obtained by the image data obtaining unit 5 (Step 102).

Here, if an instruction to change the set value of the image input patch 30 is received by the instruction receiving unit 1 (Yes in Step 103), the patch image is converted and displayed again on the basis of the changed set value.

It is determined whether or not an image processing patch is arranged on the image input patch 30 (Step 105). If an image processing patch is not arranged on the image input patch (No in Step 105), it is determined whether or not an image analysis patch is arranged on the image input patch 30 (Step 106). If an image processing patch is not arranged on the image input patch 30 (No in Step 106), the display of the patch image is continued as it is (Step 107).

If an image processing patch is arranged on the image input patch 30 (Yes in Step 105), the processing proceeds to the flowchart shown in FIG. 4. That is, on the basis of the image data input by the image input patch 30, image data corresponding to the designated region of the image processing patch is obtained as input data (Step 201). The image processing is then performed on the obtained input data (Step 202).

Here, if an instruction to change the set value of the image processing patch is received by the instruction receiving unit 1 (Yes in Step 203), the patch image based on the processing result is converted and displayed again on the basis of the changed set value (Step 204).

It is determined whether or not an image analysis patch is arranged on the image processing patch (Step 106). If an image analysis patch is not arranged on the image processing patch (No in Step 106), the display of the patch image is continued as it is (Step 107).

If it is determined in Step 106 of FIG. 3 that an image analysis patch is arranged on the image input patch 30, the processing proceeds to the flowchart shown in FIG. 5. Further, if it is determined in Step 106 shown in FIG. 4 that an image analysis patch is arranged on the image processing patch, the processing also proceeds to the flowchart shown in FIG. 5.

As shown in FIG. 5, on the basis of the image data input by the image input patch 30 or the image data which is the processing result of the image processing patch, the image data corresponding to the designated region of the image analysis patch is obtained as input data (Step 301). The image analysis is then performed on the obtained input data (Step 302).

Here, if an instruction to change the set value of the image analysis patch is received by the instruction receiving unit 1 (Yes in Step 303), the patch image based on the analysis result is converted and displayed again on the basis of the changed set value (Step 304). If there is no instruction to change the set value of the image analysis patch, the display of the patch image is continued as it is (Step 305).

Figure 6:
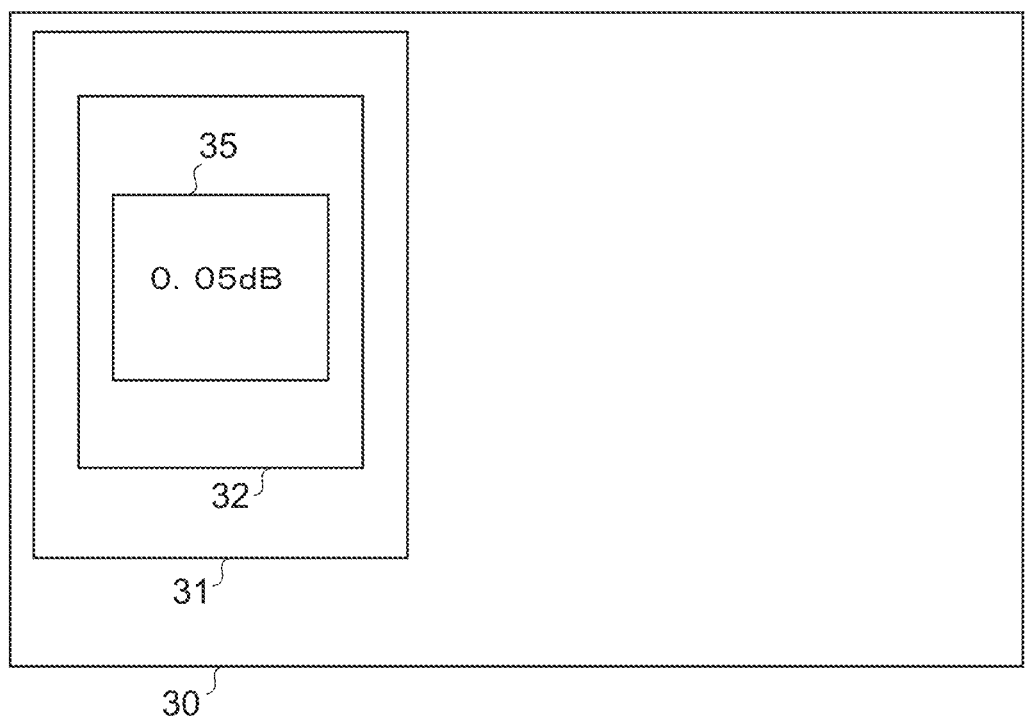
FIG. 6 is a schematic diagram for describing the movement of a patch.
Figure 6:
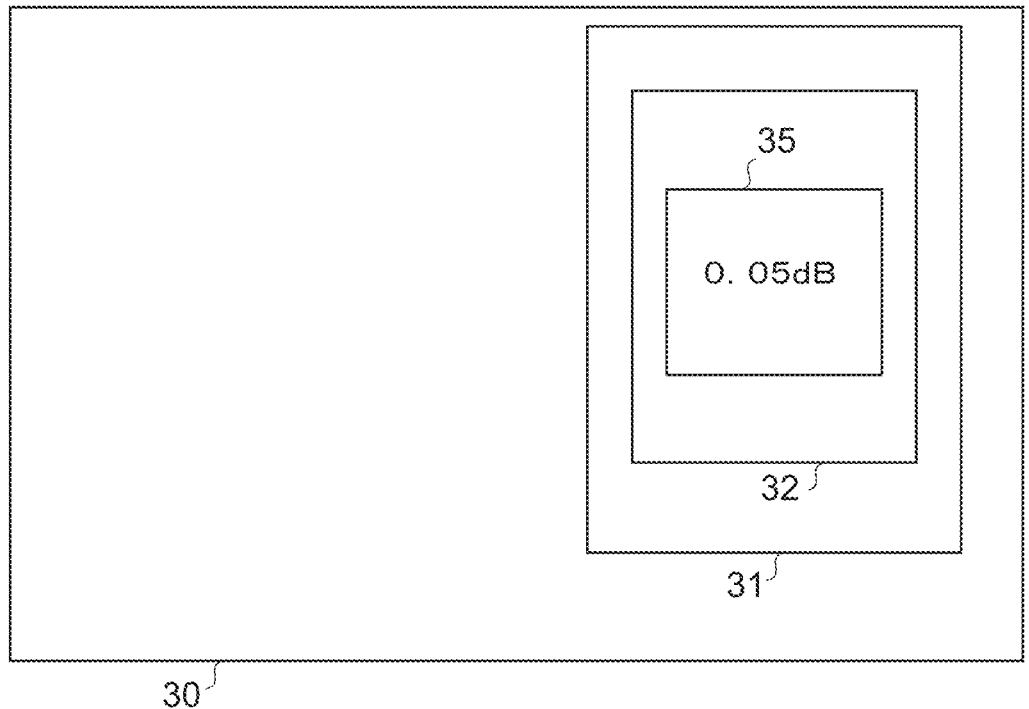
Figure 7:
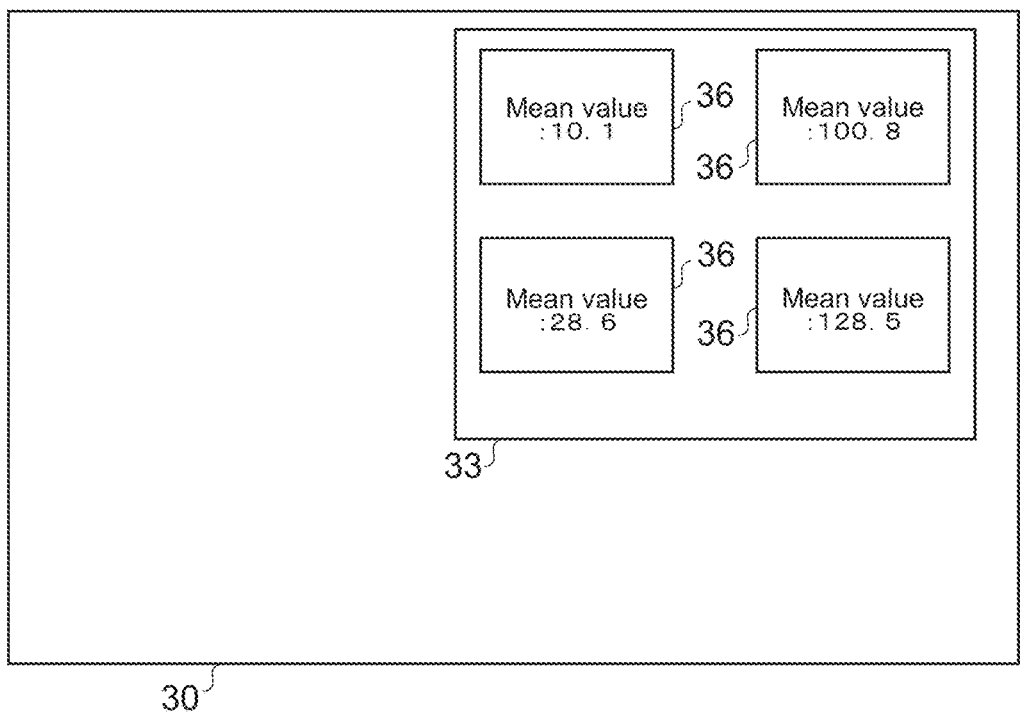
FIG. 7 is a schematic diagram for describing the movement of a patch.
Figure 7:
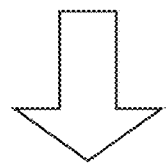
Figure 7:
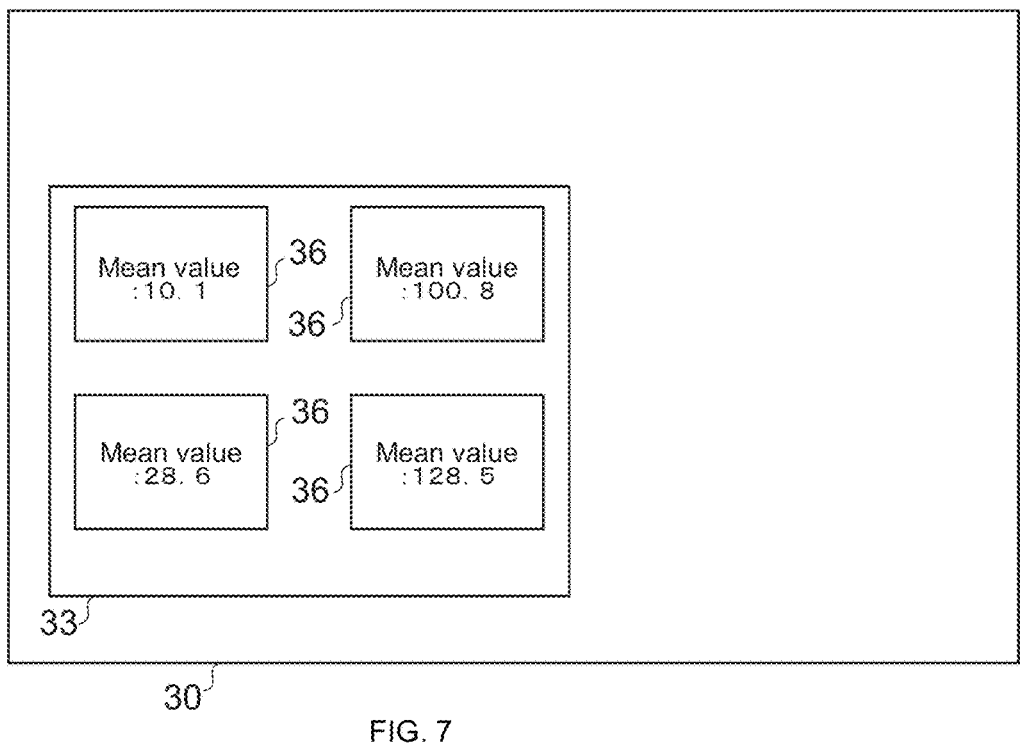

FIGS. 6 and 7 are schematic diagrams for describing the movement of the patches. As described above, in this embodiment, the patch can be moved by the user. At this time, for the patches implementing a plurality of pipelines, the patches can be moved while maintaining a configuration implementing a plurality of pipelines (hereinafter referred to as a pipeline configuration).

For example, for two patches to be a parent patch (first designation image) and a child patch (second designation image), the child patch is moved in conjunction with the movement of the parent patch. That is, when the parent patch is moved, the child patch is moved in conjunction with the movement of the parent patch while maintaining the positional relationship between the parent patch and the child patch.

In the example shown in FIG. 6, a pipeline configuration is implemented by the noise removal patch 31, the edge enhancement patch 32, and the S/N analysis patch 35. Here, when the noise removal patch 31 moves, the edge enhancement patch 32 serving as the child patch of the noise removal patch 31 moves in conjunction with the movement of the noise removal patch 31. The edge enhancement patch 32 moves while maintaining the positional relationship with respect to the noise removal patch 31.

When the edge enhancement patch 32 moves, the S/N analysis patch 35 serving as the child patch of the edge enhancement patch 32 moves in conjunction with the movement of the edge enhancement patch 32. The S/N analysis patch 35 moves while maintaining the positional relationship with respect to the edge enhancement patch 32.

Therefore, moving the noise removal patch 31 makes it possible to move the noise removal patch 31, the edge enhancement patch 32, and the S/N analysis patch 35 while maintaining the pipeline configuration. This makes it possible to execute the pipeline of the noise removal patch 31, the edge enhancement patch 32, and the S/N analysis patch 35 on a desired region.

As described above, in this embodiment, moving a patch makes it is possible to simultaneously move a plurality of patches having a pipeline configuration in which the above-mentioned patch is at the bottom. As a result, very high usability can be exhibited.

On the other hand, when the child patch (second designation image) is moved, the child patch is moved independently of the parent patch (second designation image). For example, when the edge enhancement patch 32 shown in FIG. 6 is moved, the edge enhancement patch 32 is moved independently of the noise removal patch 31. This makes it possible to move the edge enhancement patch 32 to a desired position within the designated region of the noise removal patch 31. Note that the S/N analysis patch 35 moves in conjunction with the movement of the edge enhancement patch 32.

In the example shown in FIG. 7, the pipeline configuration is implemented by the low-pass filter patch 33 and the four statistical analysis patches 36. When the low-pass filter patch 33 serving as the parent patch is moved, the four statistical analysis patches 36 move in conjunction with the movement of the low-pass filter patch 33 while maintaining the pipeline configuration. This makes it possible to exhibit high usability. Note that the four statistical analysis patches 36 can be moved independently of the low-pass filter patch 33.

As described above, in this embodiment, the child patch is moved in conjunction with the movement of the parent patch. This example corresponds to an embodiment of a technical matter of "moving the second designation image in conjunction with the movement of the first designation image when an overlap region exists". Further, this example corresponds to an embodiment of a technical matter of "moving the second designation image in conjunction with the movement of the first designation image when the entire second designated region is an overlap region". Further, this example corresponds to an embodiment of a technical matter of "moving the second designation image in conjunction with the movement of the first designation image while maintaining the positional relationship between the first designation image and the second designation image".

Note that the first designation image and the second designation image are not limited to the parent patch and the child patch described in this embodiment, respectively. The parent patch is merely an embodiment of the first designation image according to the present technology. Further, the child patch is an embodiment of the second designation image according to the present technology.

The present technology may include any configuration in which, when an overlap region exists in the designated regions of two designation images, in conjunction with movement of at least one of designation images, the other designation image is moved. In this case, at least one of the designation images is the first designation image, and the other designation image is the second designation image.

For example, the present technology is not limited to the case where the entire designated region of one designation image is included in the designated region of the other designation image. When the designated regions partially overlap with each other, display control such as moving the other designation image in conjunction with the movement of one designation image may be executed.

For example, when a part of the image processing patch overlaps with a part of the region of the image input patch 30, processing such as moving the image processing patch in conjunction with the movement of the image input patch 30 may be executed. In addition, the present technology is not limited to the case where the positional relationship between the patches is maintained.

Figure 8:
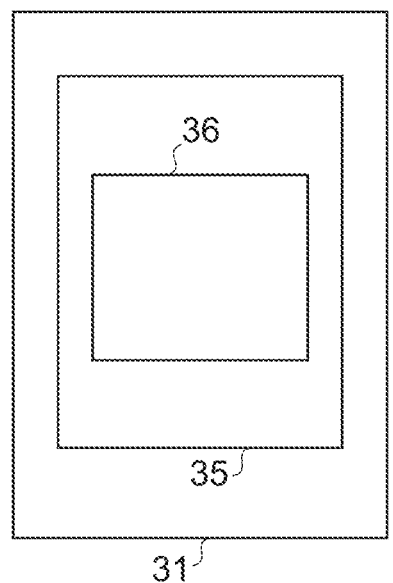
FIG. 8 is a schematic diagram showing a notification as to whether or not it is possible to cope with image data input to a patch.

FIG. 8 is a schematic diagram showing a notification as to whether or not it is compatible with image data input to a patch.

As shown in FIG. 8, in the case where the patch B is arranged on the patch A (in the case where the entire designated region B is included in the designated region A), there may be a case where the execution of image processing or image analysis is impossible (incompatible) depending on the type of the input image data. In this case, information indicating that the execution of the processing is impossible is displayed for the user.

For example, when the S/N analysis patch 35 is arranged in a nested manner on the noise removal patch 31 that outputs a compatible image, the frame line of the S/N analysis patch 35 is displayed in white on the display apparatus 19. Further, if the S/N analysis patch 35 is not compatible with the image data output from the noise removal patch 31, the frame line of the S/N analysis patch 35 is displayed in red on the display apparatus 19.

Further, even in the case where the statistical analysis patch 36 is arranged on the S/N analysis patch 35 that outputs compatible image data, if the statistical analysis patch 36 is not compatible with the image output from the noise removal patch 31 that is the parent patch of the S/N analysis patch 35, the frame line of the statistical analysis patch 36 is displayed in yellow on the display apparatus 19.

Further, when the processing associated with the patch is compatible (in the state where the frame line of the child patch is white), the child patch may also be moved while maintaining the positional relationship if the parent patch is moved. Conversely, when the processing associated with the patch is not compatible (in the state where the frame line of the child patch is red or yellow), the linkage of the movement of the child patch with the movement of the parent patch may be canceled.

That is, in the present image processing system 100, when the execution of the second processing using the result of the first processing as an input is impossible, information indicating that the execution of the second processing is impossible can be displayed. Further, in the present image processing system 100, when the execution of the second processing using the result of the first processing as an input is impossible, the linkage of the movement of the second designation image with the movement of the first designation image can be canceled.

Note that the information for the user indicating that the patch processing cannot be executed is not limited. For example, a sentence notifying that the processing cannot be executed may be displayed on the display apparatus 19.

Figure 9:
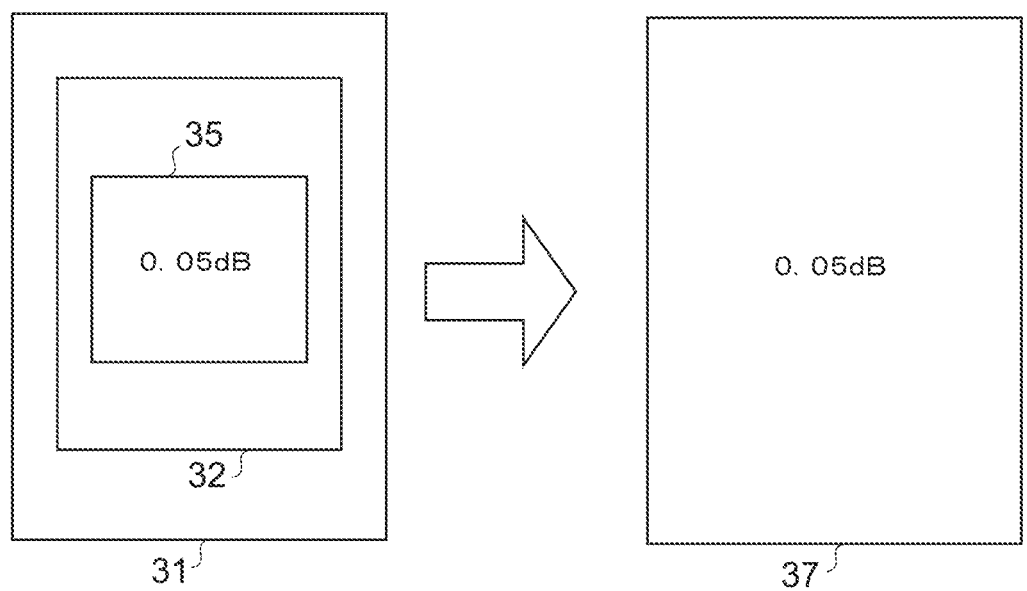
FIG. 9 is a schematic diagram showing attachment performed on different patches.

FIG. 9 is a schematic diagram showing attachment performed on different patches. In FIG. 9, a case of performing attachment on the pipeline configuration of the noise removal patch 31, the edge enhancement patch 32, and the S/N analysis patch 35 shown in FIG. 6 or the like will be exemplified.

The user can perform attachment on each patch. As shown in FIG. 9, the shape and size of the designated regions of the noise removal patch 31, the edge enhancement patch 32, and the S/N analysis patch 35 on which the attachment has been performed will be the same as the shape and size of the designated region of the noise removal patch 31 that is the parent patch.

Hereinafter, the patches of FIG. 9 that are each subjected to attachment and seem to be one patch will be referred to as an attachment patch 37.

That is, on the basis of the received instruction of the user, the parent patch and the child patch are synthesized such that the entire region of the parent patch and the entire region of the child patch overlap with each other, and the display is controlled such that the synthesized parent patch and child patch are set as the attachment patch 37, which designates the overlap region and is associated with the processing of the parent patch and the processing of the child patch.

The processing executing unit 7 executes the processing associated with the noise removal patch 31, the edge enhancement patch 32, and the S/N analysis patch 35, which have changed into the attachment patch 37, from the processing associated with the noise removal patch 31. That is, the processing executing unit 7 executes the processing in descending order of the regions of the respective patches before being synthesized to be the attachment patch 37.

The processing result image displayed on the region of the attachment patch 37 displays 0.05 dB as the processing result image associated with the S/N analysis patch 35. That is, the processing result image of the smallest patch in the regions of the respective patches before being synthesized to be the attachment patch 37 is displayed.

The designated region determining unit 4 changes the region designated by the attachment patch 37. Further, the designated region determining unit 4 moves the attachment patch 37 by a user's operation. In this embodiment, the designated region determining unit 4 simultaneously performs change or movement of the region on the noise removal patch 31, the edge enhancement patch 32, and the S/N analysis patch 35 on which the attachment has been performed.

That is, when the entire region of the noise removal patch 31, the entire region of the edge enhancement patch 32, and the entire region of the S/N analysis patch 35 are overlap regions, the designated region determining unit 4 simultaneously moves the noise removal patch 31, the edge enhancement patch 32, and the S/N analysis patch 35.

Further, the designated region determining unit 4 moves the edge enhancement patch 32 and the S/N analysis patch 35 independently of the noise removal patch 31, except when the entire region of the noise removal patch 31, the entire region of the edge enhancement patch 32, and the entire region of the S/N analysis patch 35 are overlap regions.

Further, when an instruction to cancel the attachment from the user is received, the designated region determining unit 4 returns the areas of the regions of the edge enhancement patch 32 and the S/N analysis patch 35 to the areas of the regions of the edge enhancement patch 32 and the S/N analysis patch 35 before being changed into the attachment patch 37.

Note that the number of patches included in the attachment patch 37 is not limited. For example, four or more patches may be attached. In this case, the processing of attaching patches performed by the processing executing unit 7 is performed from a patch having a larger area of the patch region (parent patch). Further, an instruction to perform attachment is not also limited. Attachment may be performed sequentially on each patch, or a command to simultaneously perform attachment on all patches may be used.

Further, an instruction to execute attachment is not limited. For example, attachment may be executed when the S/N analysis patch 35 is moved so as to overlap the edge enhancement patch 32. Further, for example, attachment may be executed when the region of the child patch is the same as the region of the parent patch.

The processing result of the patch on which each processing is executed is displayed in the region of the patch or in the region of the child patch regardless of the type. In this case, in each patch, conversion processing for displaying the processing result and transfer processing such as copying from the GPU to the memory area of the CPU are performed.

On the other hand, in the attachment patch, the display can be confirmed only in the child patch having the region of the smallest area, and the other parent patches are hidden and therefore cannot be visually confirmed. As a result, the conversion processing for displaying the processing result and the transfer processing for patches other than the child patch having the region of the smallest area in the attachment patch are stopped, thereby making it possible to improve the processing speed.

Note that, in this embodiment, the attachment patch 37 corresponds to a synthesized designation image associated with the first processing and the second processing.

Figure 10:
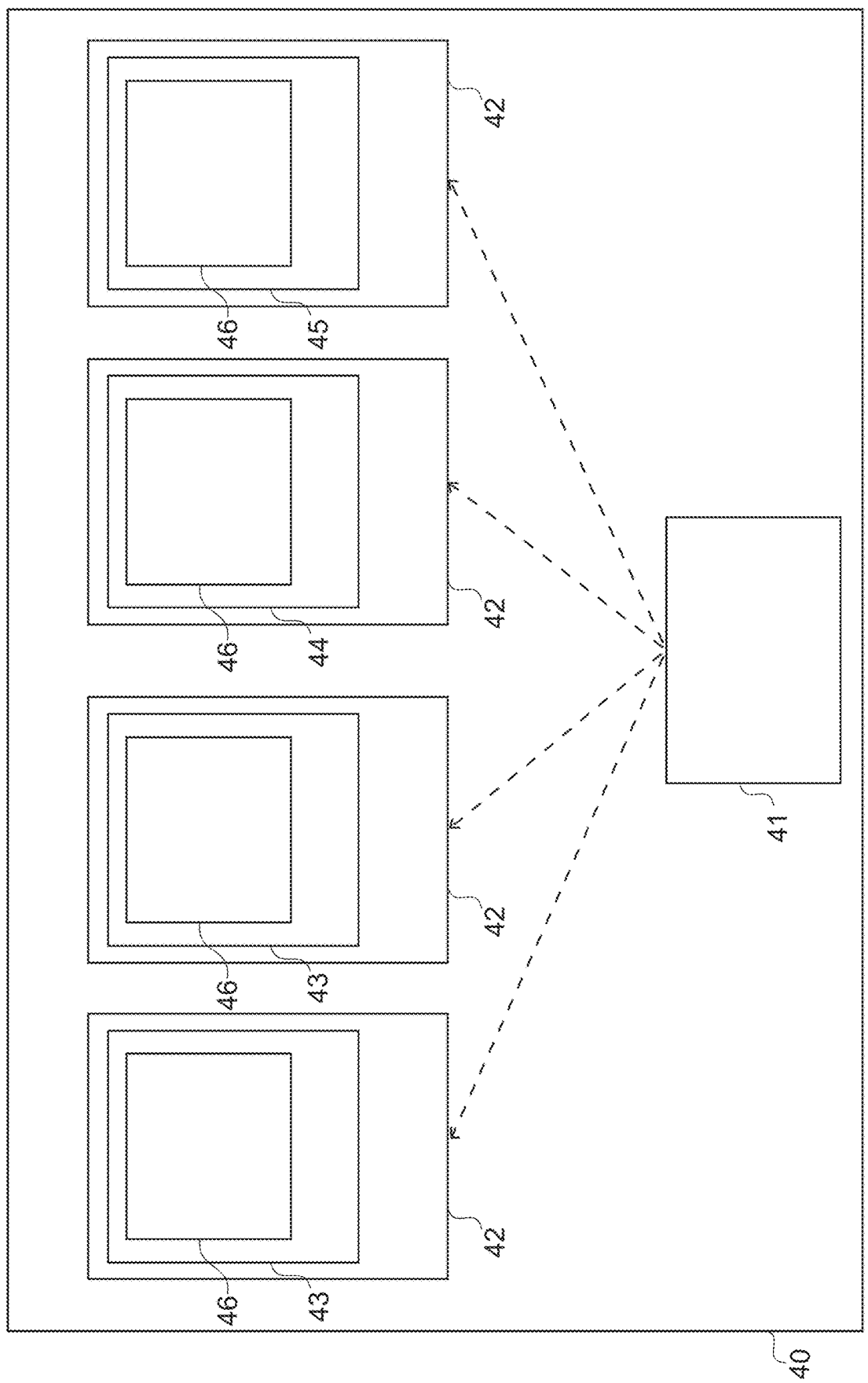
FIG. 10 is a schematic diagram showing aliases.

FIG. 10 is a schematic diagram showing aliases.

The processing selecting unit 3 copies the results of the processing related to the image input patch, the image processing patch, and the image analysis patch, and displays them in a rectangular shape at different positions. Hereinafter, a rectangular frame in which the result of the processing is copied will be referred to as an alias.

In this embodiment, the results of the processing of a noise removal image processing patch 41 are arranged at the same time at four different positions in respective aliases 42 arranged on an image input patch 40. That is, the alias 42 outputs the result of the processing of the noise removal image processing patch 41.

Further, as shown in FIG. 10, the processing selecting unit 3 arranges image processing A patches 43, an image processing C patch 44, an image processing D patch 45, and S/N analysis processing patches 46 on the aliases 42.

The designated region determining unit 4 determines the region designated by the alias 42. In this embodiment, the designated region determining unit 4 determines the region of the alias 42 so as to have a larger area than those of the regions of the image processing A patch 43, the image processing C patch 44, and the image processing D patch 45.

The designated region determining unit 4 determines the region designated by the S/N analysis processing patch 46 so as to have a smaller area than those of the regions of the image processing A patch 43, the image processing C patch 44, and the image processing D patch 45.

The processing executing unit 7 executes processing associated with the image processing A patch 43, the image processing C patch 44, and the image processing D patch 45 arranged on the aliases 42. That is, the input data obtaining unit 6 obtains image data output from the aliases 42 as image data input to the image processing A patch 43, the image processing C patch 44, and the image processing D patch 45.

Similarly, the processing executing unit 7 executes processing associated with the S/N analysis processing patches 46 arranged on the image processing A patch 43, the image processing C patch 44, and the image processing D patch 45.

That is, the processing executing unit 7 executes processing associated with the image processing patch or the image analysis patch on the region designated by the image processing patch or the image analysis patch, using the alias 42 as the image data.

Thus, by using the alias 42, it is possible to compare the effects obtained by changing the image processing parameters (set values) and to execute performance evaluation using different algorithms for the same region in parallel, thereby making it possible to improve the efficiency of evaluation.

Note that the place where the alias 42 is arranged is not limited and may be arbitrarily arranged. For example, the alias 42 may be arranged outside the region of the image input patch 40. Further, a copied image (alias) may also be generated and displayed for any patch in the pipeline configuration of the patches.

Note that, in this embodiment, the alias 42 corresponds to a copied image that is an image in which the processing result image is copied.

Figure 11:
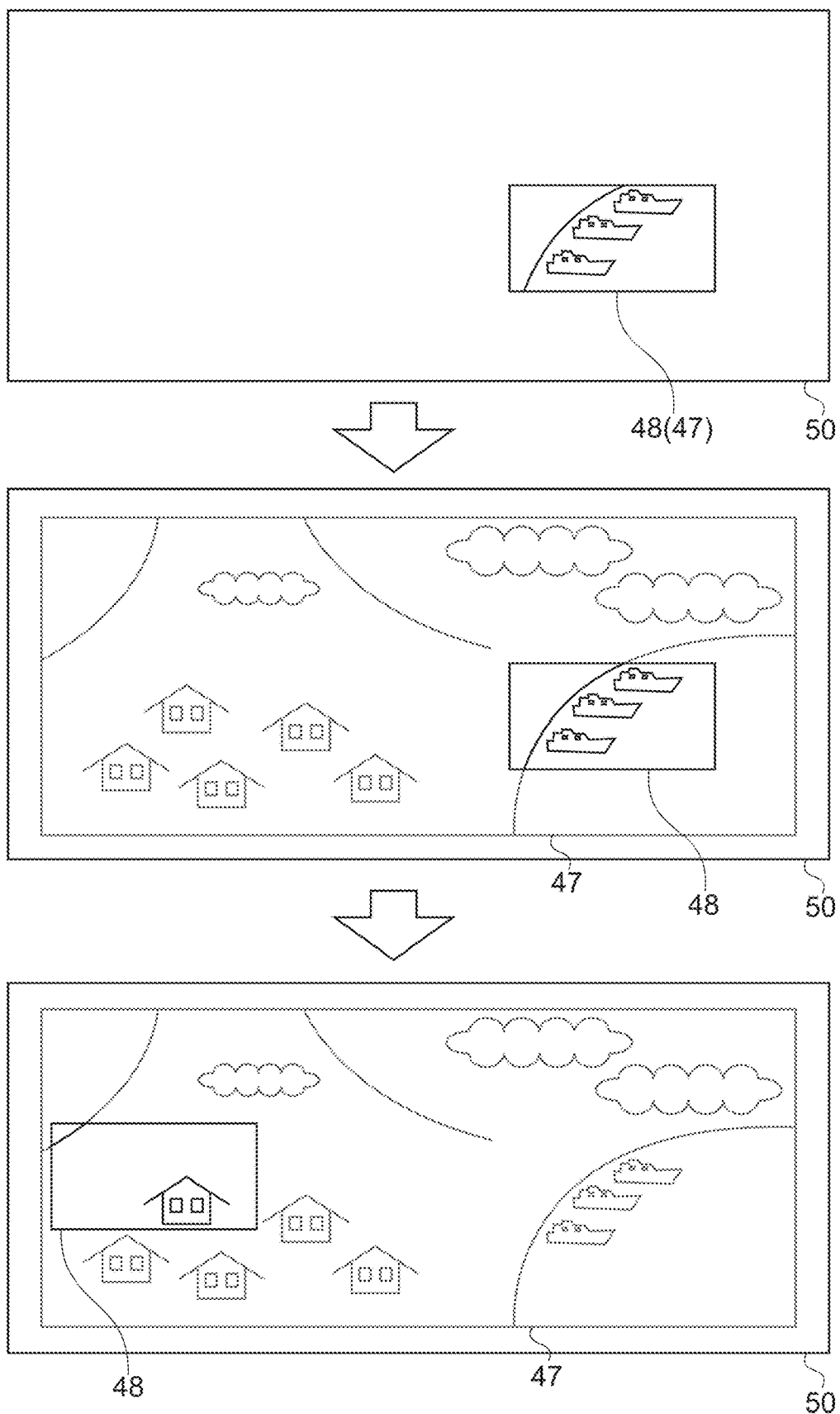
FIG. 11 is a schematic diagram showing an example of image display of an image input patch.

FIG. 11 is a schematic diagram showing an example of the image display of an image input patch.

The image data obtaining unit 5 obtains image data 47 input from the outside. The patch image generating unit 9 generates a patch image in which the image data 47 is displayed in the region of an image input patch 48 by the processing selecting unit 3 and the processing executing unit 7. The image data 47 is displayed in the image input patch 48 of a display 50.

As shown in FIG. 11, the designated region determining unit 4 changes the region of the image input patch 48 on the basis of an instruction of the user. In this case, the image data that is part of the image data 47 is displayed in the region of the image input patch 48 whose region has been changed. That is, the image data 47, which is the entire image, is not displayed, but a corresponding portion of the image data 47 is displayed so as to be cut out in accordance with the coordinates and the region in which the image input patch 48 is arranged only within the region of the image input patch 48.

The user can arbitrarily move the image input patch 48. For example, the image input patch 48 can be moved by a user holding a mouse cursor on an image input patch and clicking a mouse button or pressing a button for a long time.

In this case, a portion of the image data 47 corresponding to the region of the moved image input patch 48 is displayed in the region of the image input patch 48.

Further, in this embodiment, when the user presses the mouse button for a long time, a portion of the input image data 47 other than the region of the image input patch 48 is displayed in a translucent state. That is, when the image input patch 48 is moved by the user, the entire image of the image data 47 is displayed in a translucent manner at the same time as when the movement of the image input patch 48 becomes possible, so that the image data to be displayed can be easily selected.

When the instruction to move the image input patch 48 is stopped, the movement of the image input patch 48 is stopped, and the image data 47 displayed in a translucent manner is not displayed.

Note that the instructions to move the image input patch 48 and to display the image data 47 in a translucent manner are not limited. For example, a particular command or button that allows the image input patch 48 to be moved may be accepted.

Note that, in this embodiment, the entire image of the image data 47 displayed in a translucent manner corresponds to information indicating the position of the designation image with respect to the target image. That is, the entire image of the image data 47 displayed in a translucent manner corresponds to the entire image of the target image displayed with reference to the position of the designation image.

Figure 12A:
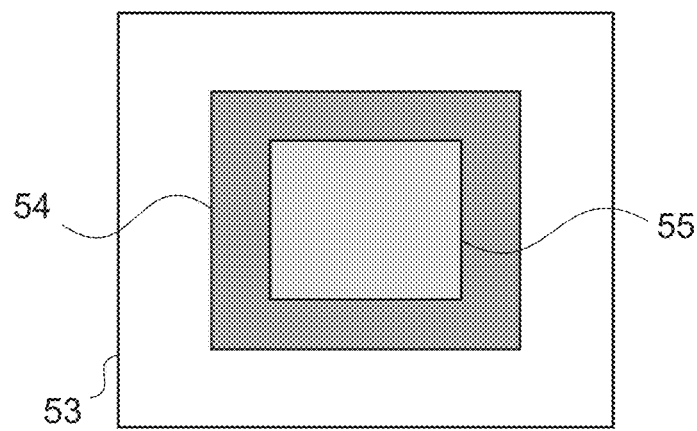
FIGS. 12A and 12B are schematic diagrams showing an example of processing in which attachment and alias are combined.
Figure 12B:
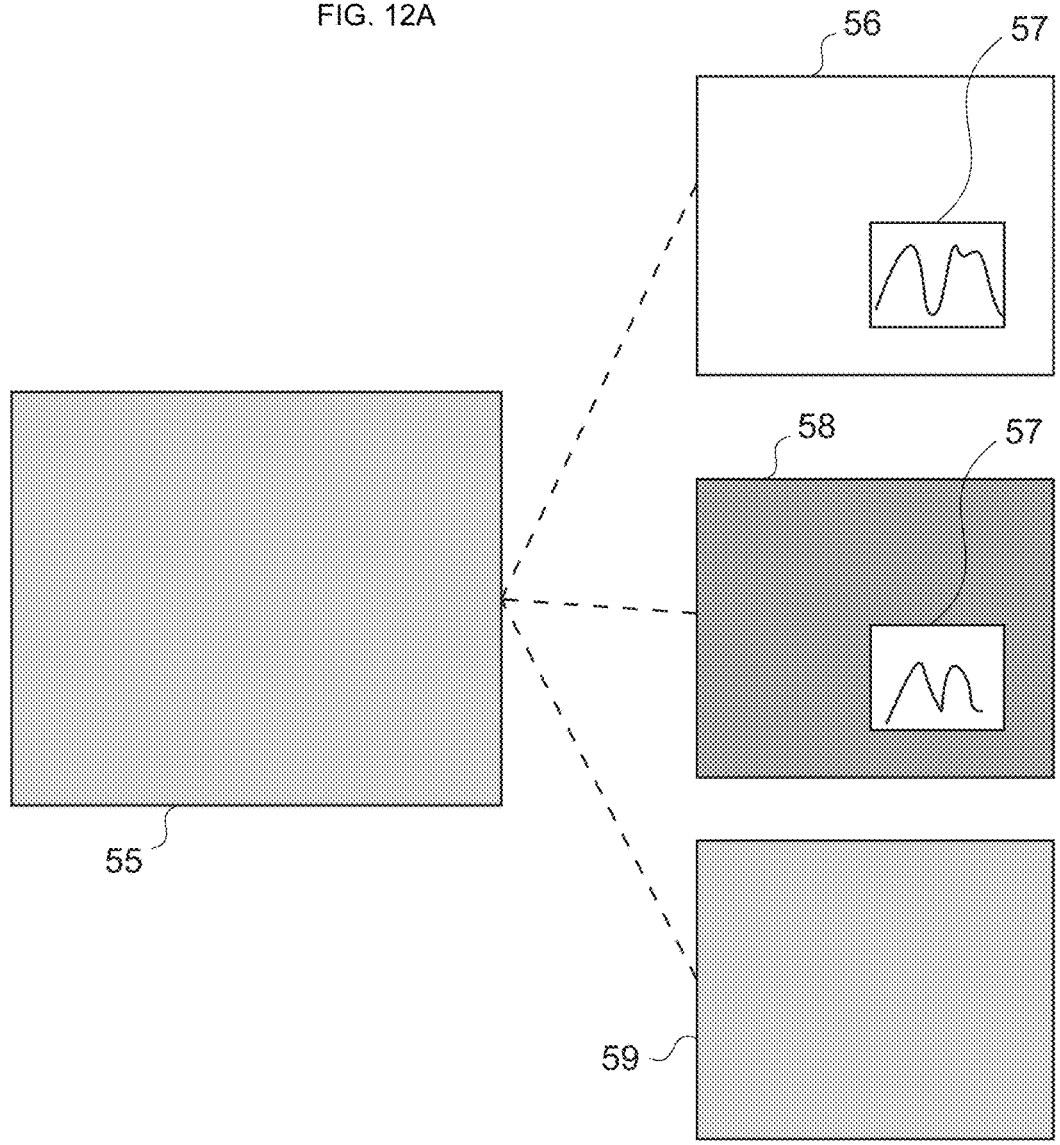

FIGS. 12A and 12B are schematic diagrams showing an example of processing in which attachment and alias are combined. In FIGS. 12A and 12B, a method for easily confirming the process of each image processing by creating an alias when the attachment is performed will be described.

As shown in FIG. 12A, it is assumed that an image input patch 53, an image processing patch A 54, and an image processing patch B 55 are arranged on the screen in a nested manner. Specifically, the patches are arranged such that the area of the region of the image input patch 53 is the largest, and the area of the region of the image processing patch B 55 is the smallest.

In this case, the processing executing unit 7 executes processing in the order of the processing of the image input patch 53, the processing of the image processing A patch 54, and the processing of the image processing B patch 55 in descending order of area.

As shown in FIG. 12B, prior to performing attachment on the image input patch 53, the image processing patch A 54, and the image processing patch B 55, aliases of the respective patches are created. In FIG. 12B, aliases are arranged in the order of processing to be executed in order to make the flow of image processing performed on image data more visible.

In this embodiment, in order to evaluate the effect of each image processing, an image analysis patch 57 is arranged in the region of an alias 56 of the image input patch 53. Further, the same image analysis patch 57 is arranged in the region of an alias 58 of the image processing patch A 54 at the same position (coordinates) as the image analysis patch 57 arranged in the alias 56.

Further, in this embodiment, an alias 59 of the image processing patch B 55 is arranged. This makes it possible to intuitively develop, evaluate, and debug the image processing algorithm by simultaneously comparing the evaluations of the image processing of the image processing patch A 54 and the image processing patch B 55 performed on the input image data.

Figure 13A:
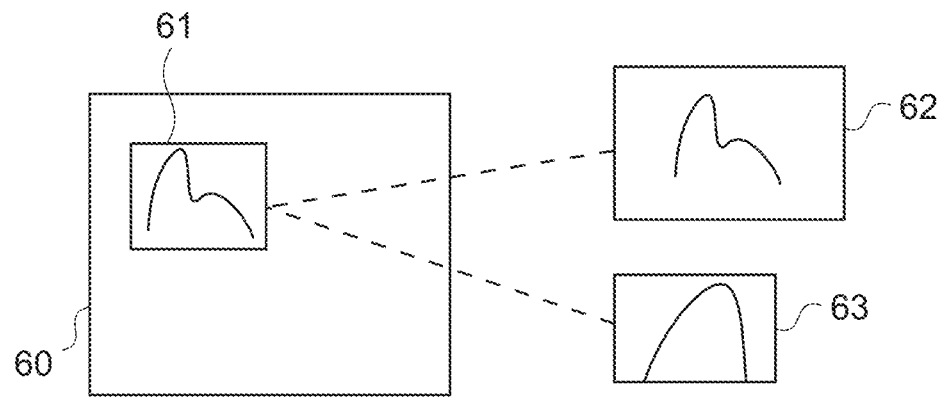
FIGS. 13A and 13B are schematic diagrams showing an example of processing in which attachment and alias are performed on aliases.
Figure 13B:
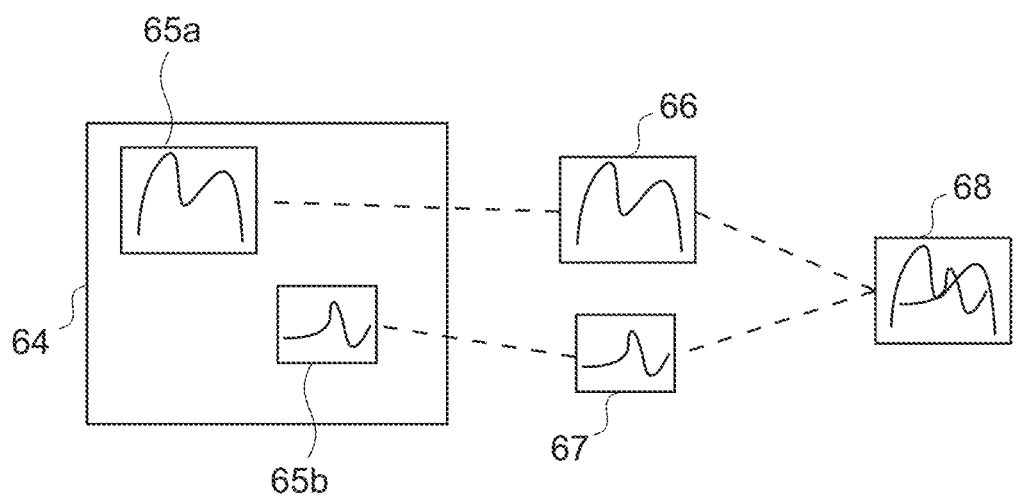

FIGS. 13A and 13B are schematic diagrams showing an example of processing in which attachment and alias are performed on aliases. FIG. 13A is a schematic diagram showing processing of performing alias a plurality of times on an image analysis patch. FIG. 13B is a schematic diagram showing processing of performing attachment on aliases.

As shown in FIG. 13A, an image analysis patch 61 is arranged on an image input patch 60 displaying image data. The processing executing unit 7 executes predetermined image analysis on the region in which the image analysis patch 61 is arranged. The patch image generating unit 9 displays the result of the image analysis in the region designated by the image analysis patch 61.

At this time, it is assumed that alias is performed twice on the image analysis patch 61. That is, an alias 62 for displaying the analysis result output by the image analysis patch 61 as it is and an alias 63 for enlarging and displaying a part of the analysis result output by the image analysis patch 61 are arranged.

That is, the designated region determining unit 4 is capable of determining the regions designated by the aliases 62 and 63 regardless of the region designated by the copied image analysis patch 61, and displaying those regions so as to be cut out. As a result, the details of the result of the image analysis performed on the image data can be confirmed at an arbitrary level.

As shown in FIG. 13B, two image analysis patches 65 for performing the same processing are arranged on an image input patch 64 displaying image data. For example, two histogram analysis processing patches are arranged in different regions on the image input patch 64. Hereinafter, the image analysis patches 65 will be referred to as an image analysis patch 65a and an image analysis patch 65b in order to distinguish them from each other.

The processing selecting unit 3 arranges an alias 66 in which the result of the image analysis processing of the image analysis patch 65a is copied. Further, the processing selecting unit 3 arranges an alias 67 in which the result of the image analysis processing of the image analysis patch 65b is copied.

When an instruction to perform attachment is given by the user, attachment can be performed on the alias 66 and the alias 67. In this case, the order of displaying the aliases 66 and 67 to be subjected to attachment is determined on the basis of the areas of the regions of the image analysis patches 65a and 65b that are copy sources.

For example, if the image analysis patch 65a is the parent patch, in the graph to be displayed as the result of the analysis processing, the graph of the image analysis patch 65b that is the child patch is displayed on the graph of the image analysis patch 65a that is the parent patch. Further, as the coordinate axes of the graph to be displayed, the set values set for the parent patch are used.

That is, as shown in FIG. 13B, by the execution of attachment, it is possible to display the results of the image analysis processing, which are displayed in the alias 66 and the alias 67, so as to overlap with each other in the region of the alias 68 subjected to attachment. This makes it possible to easily compare graphs of a plurality of analysis results by an intuitive operation.

Note that the setting of the parent patch and the child patch when the aliases are subjected to attachment is not limited. For example, an alias whose region has a larger area may function as the parent patch. That is, the order of attachment and the setting of the parent and the child may be performed on the basis of the area ratio of the aliases.

Figure 14A:
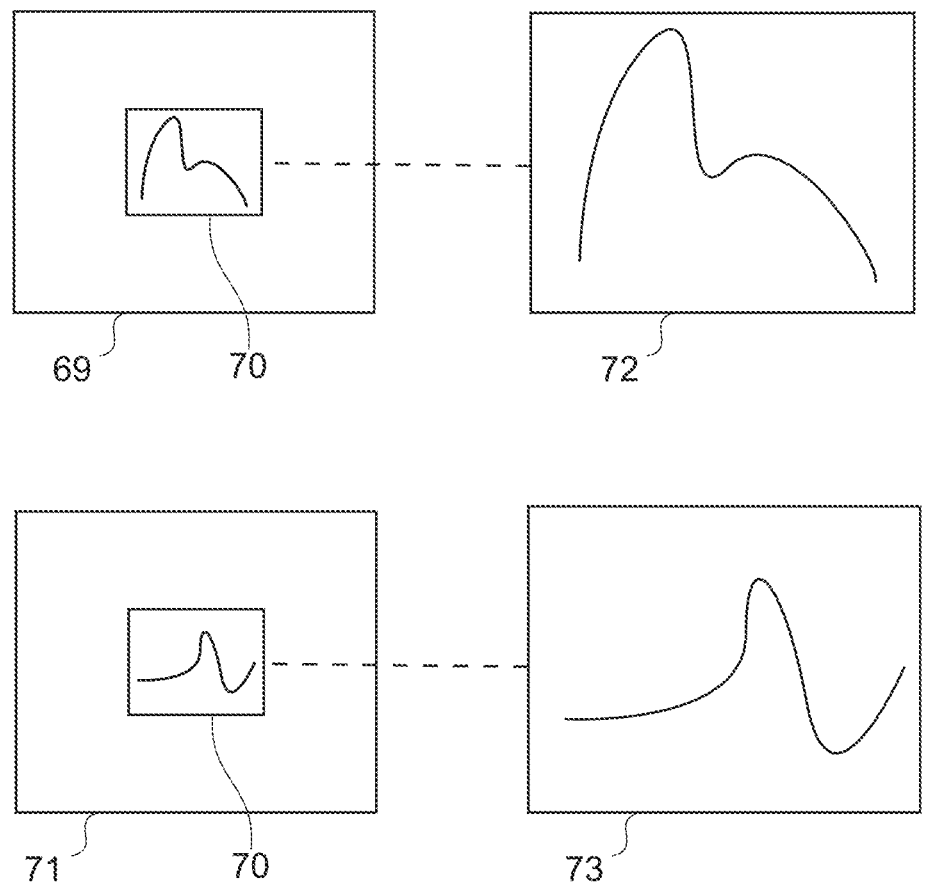
FIGS. 14A and 14B are schematic diagrams showing execution of attaching on an image input patch.
Figure 14B:
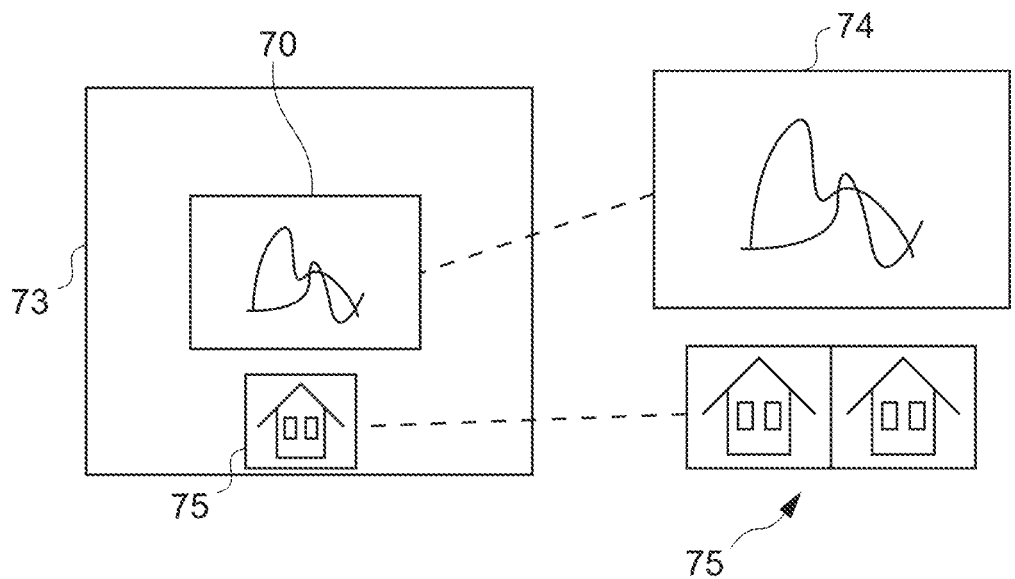

FIGS. 14A and 14B are schematic diagrams showing the execution of attachment on image input patches. FIG. 14A is a schematic diagram showing that an image analysis patch is executed on each image input patch. FIG. 14B is a schematic diagram showing various types of processing performed on image input patches subjected to attachment As shown in FIG. 14A, an image analysis patch 70 is arranged on an image input patch 69. Further, an image analysis patch 70 is arranged on an image input patch 71. In this embodiment, the image data displayed in the region of the image input patch 69 and the image data displayed in the region of the image input patch 71 are different from each other. Further, the image analysis patch 70 is arranged in the region having the same coordinates of the image input patch.

In this embodiment, aliases 72 and 73 in which the analysis results are copied are arranged for the image analysis patches 70 on the basis of an instruction of the user.

In FIG. 14B, the image input patch 69 and the image input patch 71 are subjected to attachment. As shown in FIG. 14B, when the image analysis patch 70 is arranged on an attachment patch 73 subjected to the attachment, the image analysis results of the image input patch 69 and the image input patch 71 are displayed in an overlapping manner in the region of the image analysis patch 70. Further, an alias 74 in which the analysis results are copied is arranged for the image analysis patch 70 on the basis of an instruction received by the instruction receiving unit 1.

This makes it possible to easily compare the analysis results of the regions having the same coordinates of the images to be compared.

Further, in FIG. 14B, an image comparison patch 75 is arranged on the attachment patch 73. In the image comparison patch 75, the attached image data in a designated region can be displayed side by side. In this embodiment, as shown in FIG. 14B, image data displayed by the image input patch 69 and image data displayed by the image input patch 71 are displayed side by side.

That is, the processing of the image analysis patch 70 and the processing of the image comparison patch 75 are respectively performed using the image data output from the attachment patch 73 as an input.

As a result, the image data of the region in which the image comparison patch 75 is arranged can be easily visually compared at various places while moving the image comparison patch 75. Further, when a plurality of image comparison patches 75 is arranged, it is possible to simultaneously display places to be compared. For example, the image comparison patch 75 is used when RAW images, in which each color of RGB is individually captured, of a three-plate type camera or the like are subjected to attachment.

Note that the above comparison function is not limited to the case where attachment is performed. For example, when image input patches simply overlap with each other, similar analysis may be performed on the overlapping portion.

Note that the comparison target is not limited to the image input patch. Aliases of an image input patch or image processing patch, or aliases of an image input patch and an image input patch or an image processing patch may be compared with each other.

Figure 15A:
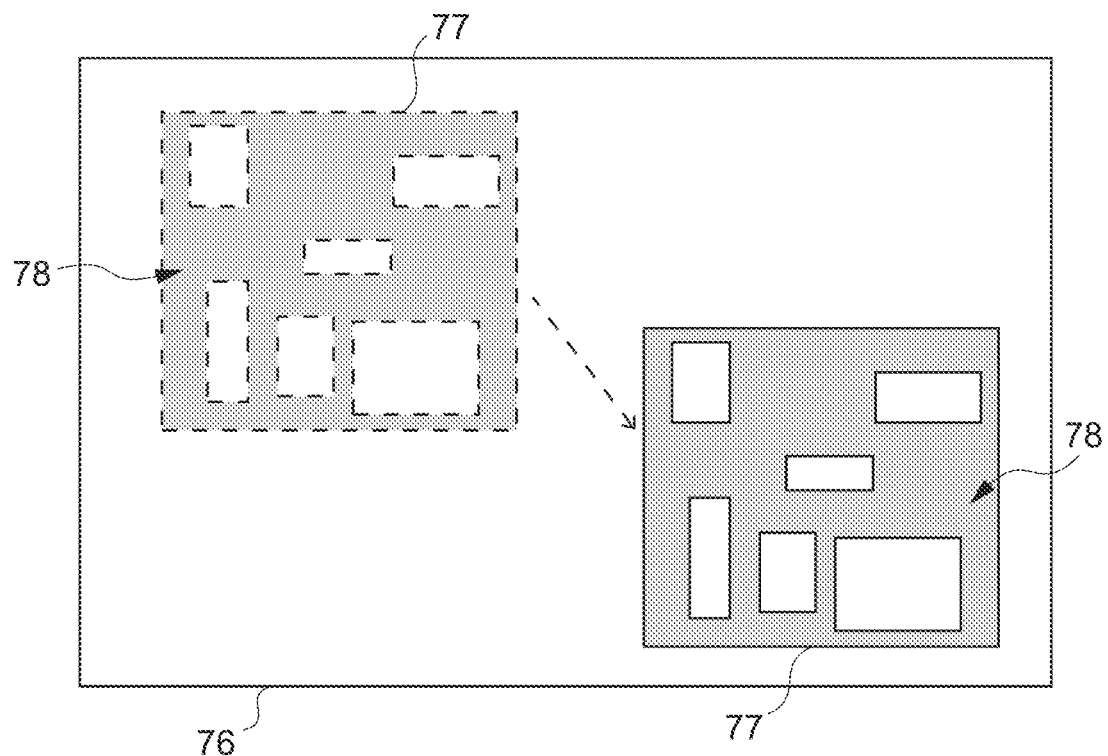
FIGS. 15A and 15B are schematic diagrams showing a layout patch and a grid patch.
Figure 15B:
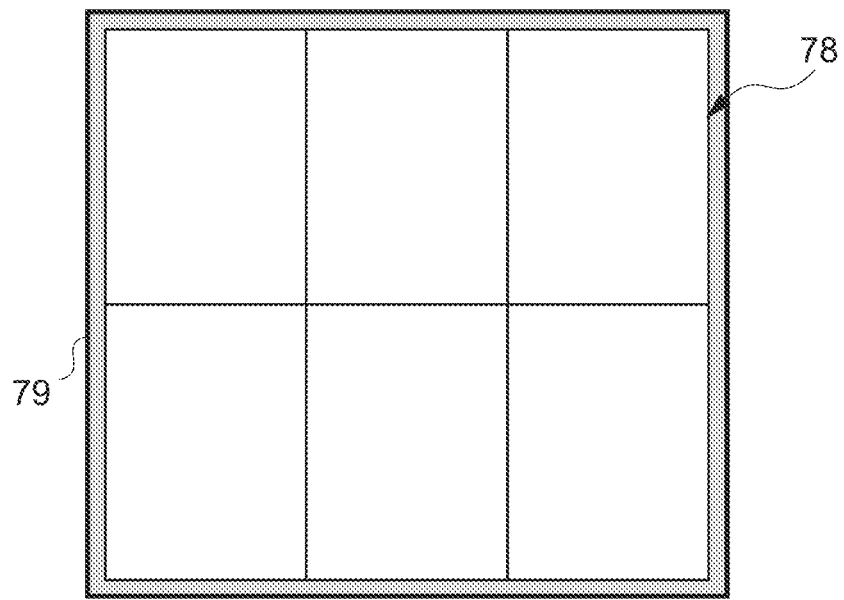

FIGS. 15A and 15B are schematic diagrams showing a layout patch 77 and a grid patch 79. FIG. 15A is a schematic diagram showing the layout patch 77. FIG. 15B is a schematic diagram showing the grid patch 79.

As shown in FIGS. 15A and 15B, the layout patch 77 is arranged on an image input patch 76, and a total of six image processing patches and image analysis patches are arranged on the layout patch 77. Hereinafter, the six image processing patches and image analysis patches will be referred to as child patches 78. That is, the layout patch 76 is a parent patch of the six image processing patches and image analysis patches.

Unlike the image processing patches or image analysis patches, the layout patch 77 is capable of transparently transmitting data output from the parent patch to the child patches 78 of the layout patch 77. For example, when the image processing patch, the layout patch, and the image analysis patch are arranged in a nested manner in this order, the result output by the image processing patch is input to the image analysis patch via the layout patch.

When the layout patch 77 is moved, the image processing patches, the image analysis patches, and the aliases arranged on the layout patch 77 are moved while maintaining the positional relationship in accordance with the movement of the layout patch 77.

The processing selecting unit 3 is capable of providing the layout patch 77 with a function of changing the position and the area of the region of the child patch 78 of the layout patch 77 on the basis of an instruction received by the instruction receiving unit 1. Hereinafter, the layout patch 77 having a function of changing the position and the area of the region of the child patch 78 of the layout patch 77 will be referred to as a grid patch 79.

As shown in FIG. 15B, when the region of the grid patch 79 is changed by the designated region determining unit 4, the region of the grid patch 79 is divided in an arbitrary pattern on the basis of the number of the child patches 78 arranged on the grid patch 79, and the area of the region and the position of each child patch 78 are changed in accordance with the divided regions.

In this embodiment, since the number of child patches 78 arranged on the grid patch 79 is six, the changed region of the grid patch 79 is divided into six equal portions in the form of a mesh. The child patches 78 are modified and arranged to be matched with the areas of the six equally divided portions of the grid patch 79.

Further, when the area of the region and the position of the child patch 78 are changed and then the area of the region of the grid patch is changed again, the area of the region of each child patch is changed while maintaining the positional relationship.

Note that the number of divisions of the grid patch 79 and the patterns of the child patches 78 to be arranged are not limited. For example, the area of the region of a patch or alias of interest may be changed to be large.

Figure 16A:
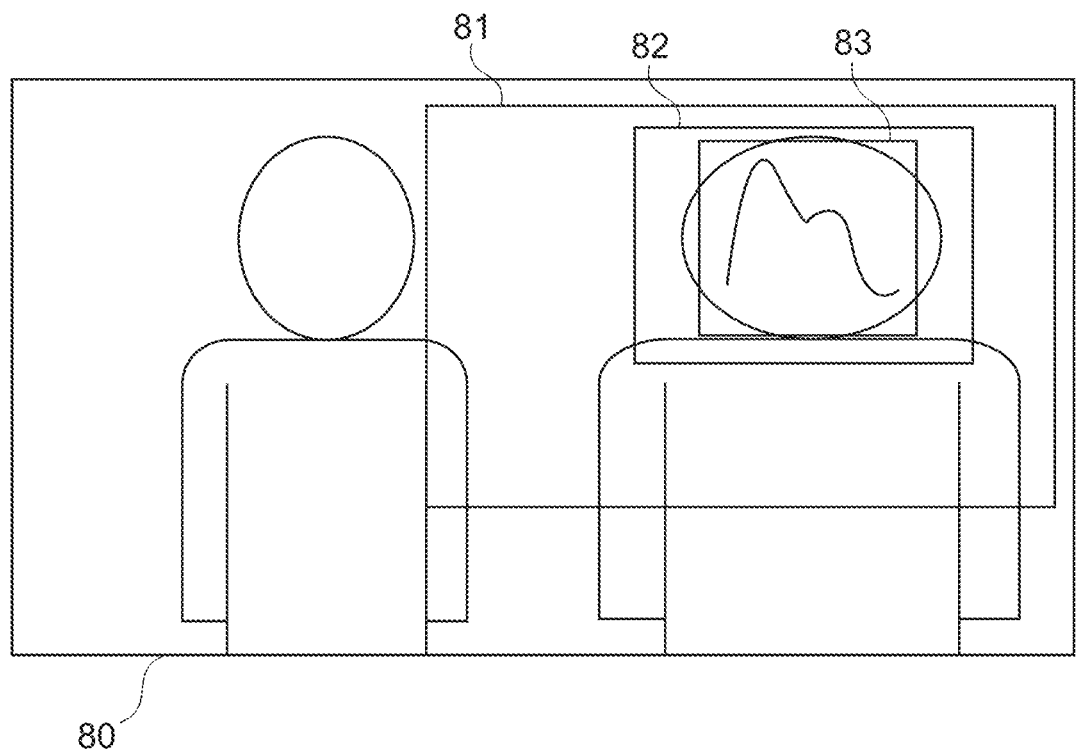
FIGS. 16A and 16B are schematic diagrams showing a tracking patch.
Figure 16B:
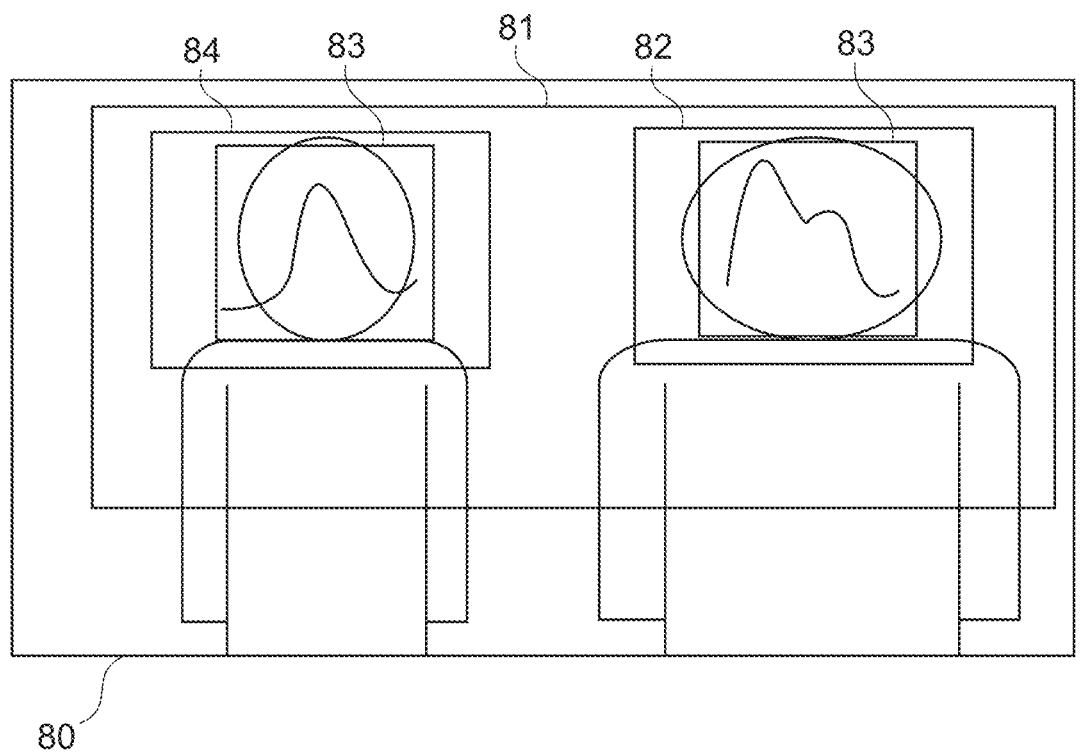

FIGS. 16A and 16B are schematic diagrams showing a tracking patch 81. FIG. 16A is a schematic diagram showing an example in which a single object is detected.

As shown in FIG. 16A, an image input patch 80 for outputting image data in which two persons stand side by side, a tracking patch 81 arranged on the image input patch 80, and a detection frame 82 are arranged.

The tracking patch 81 has a function of detecting any object from image data in a designated region. In this embodiment, the tracking patch 81 has a function of detecting, as a detection target, a face of a person of the image data displayed in the region of the image input patch 80 by the processing selecting unit 3.

Further, the tracking patch 81 detects a region, in which a face exists, of the image data, and displays the detection frame 82 so as to surround the region. That is, the tracking patch 81 causes the detection frame 82 to follow it so as to surround the region where a detection target exists.

Further, the detection frame 82 functions as a layout patch. That is, the detection frame 82 functions as a place holder for performing attachment on an image processing patch, an image analysis patch, and the like.

Further, in this embodiment, an image analysis patch 83 is arranged on the detection frame 82. The image analysis patch 83 is arranged in the region so as to surround the face of the person, and a specific analysis is performed on the face of the person.

As shown in FIG. 16B, if a plurality of detection targets exists in the region of the tracking patch 81, a plurality of detection frames is displayed so as to surround the corresponding regions in the region of the tracking patch 81. At this time, if an image processing patch or an image analysis patch is arranged in one detection frame 82, the same image processing patch or image analysis patch 83 is arranged in the region of the other detection frame 84.

Further, if a new detection target is detected in the region designated by the tracking patch 81, a detection frame is displayed so as to surround the newly detected detection target. Also in this case, if the image processing patch or the image analysis patch is arranged in the already displayed detection frame, the same image processing patch or image analysis patch 83 is arranged in the region of the newly detected detection frame.

The tracking patch 81 can be effectively used when the image data is a moving image. For example, when the image analysis patch is attached to the detection frame 82, the detection frame 82 moves in accordance with the movement of the person, so that it is possible to continuously obtain the analysis result of the image of the face portion. It is also possible to record the temporal change of the analysis result of the image from the log of the image analysis patch.

Figure 17A:
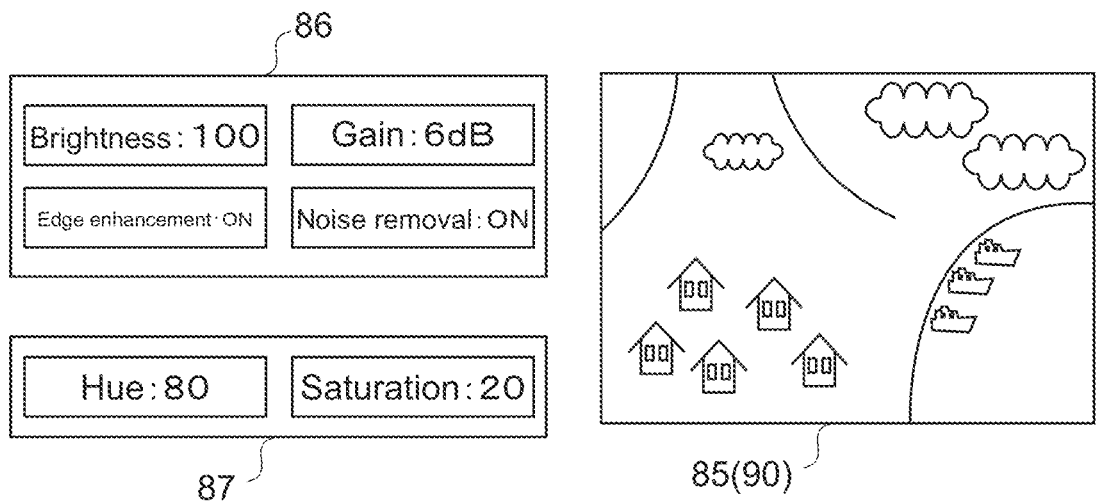
FIGS. 17A, 17B, and 17C are schematic diagrams showing a setting patch.
Figure 17B:
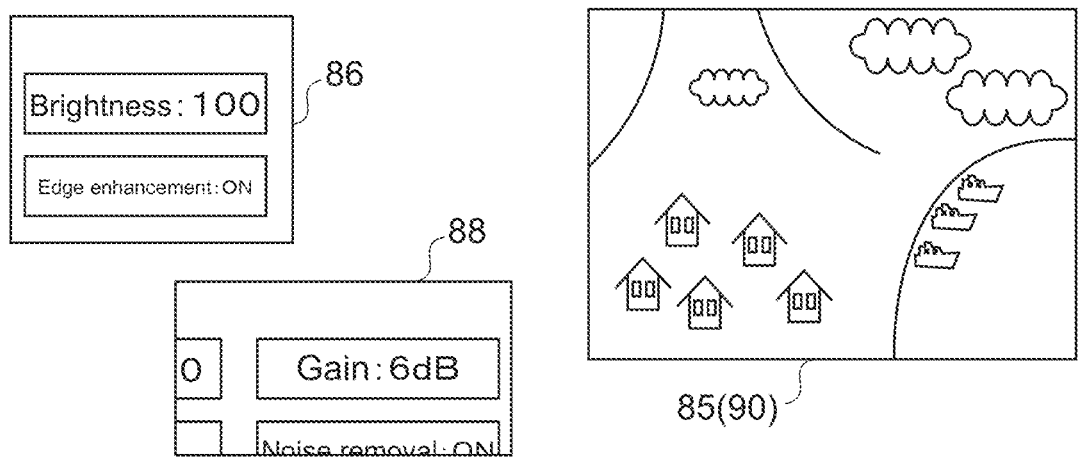
Figure 17C:
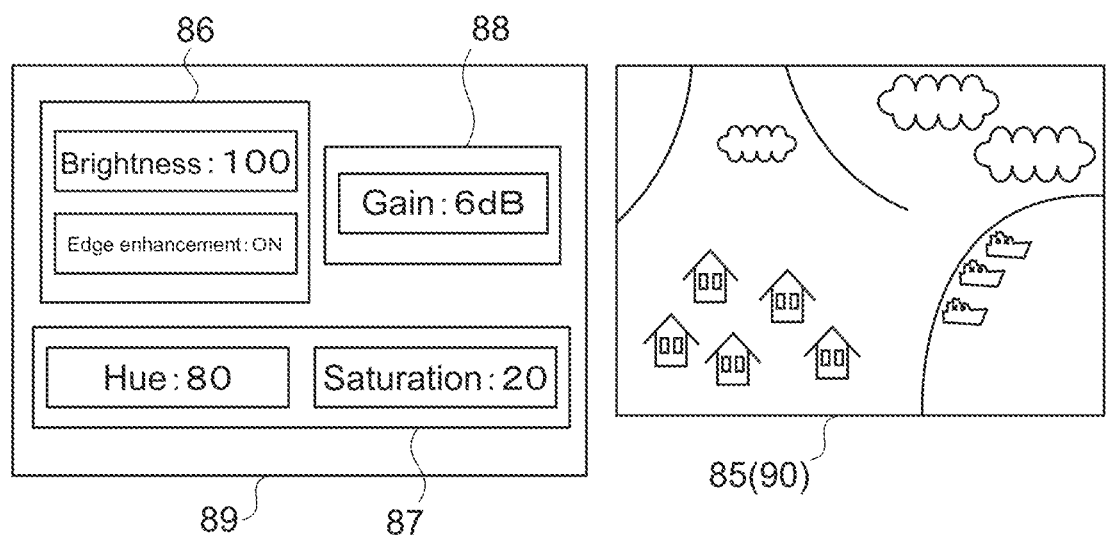

FIGS. 17A, 17B, and 17C are schematic diagrams showing a setting patch. FIG. 17A is a schematic diagram showing an arrangement of setting patches corresponding to image processing patches. FIG. 17B is a schematic diagram showing the creation of aliases of setting patches. FIG. 17C is a schematic diagram showing a plurality of setting patches arranged in a region of a layout patch.

As shown in FIG. 17A, an image processing patch 85 and a setting patch 86 are arranged. In the setting patch 86, setting items are arranged in the region of the setting patch 86 such that various set values of the image processing patch 85 are changed.

In this embodiment, the setting patch 86 corresponding to the image processing patch 85 and a setting patch 87 corresponding to an image processing patch 90 are arranged. The image processing patch 90 has an RGB value different from that of the image processing patch 85, and is attached to the image processing patch 85. Brightness, gain, edge enhancement, and noise removal are displayed as setting items in the region of the setting patch 86. In the region of the setting patch 87, hue and saturation are displayed as setting items.

That is, when the setting items arranged in the region of the setting patch 86 are changed, the image data displayed in the region of the image processing patch 85 is changed. When the setting items arranged in the region of the setting patch 87 are changed, the image data displayed in the region of the image processing patch 90 is changed. The details of the setting items arranged in the regions of the setting patch 86 and the setting patch 87 are held by the set value holding unit 2.

Note that the setting items displayed in the setting patch are not limited. For example, on the basis of the instruction of the user, any setting item may be displayed in the region of the setting patch.

As shown in FIG. 17B, the designated region determining unit 4 determines a region designated by the setting patch. At this time, the setting patch 86 and the setting patch 87 can display only part of the setting items displayed in the region of the setting patch in the same way as the image input patch. For example, the region of the setting patch is determined such that only brightness and edge enhancement, which are setting items in the setting patch 86, are displayed.

In this embodiment, an alias 88 of the setting patch 86 is copied, and the region of the alias 88 is determined by the designated region determining unit 4. This allows the user to extract only the necessary items from a large number of setting items and use them.

As shown in FIG. 17C, the setting patch 86, the setting patch 87, and the alias 88 are arranged on a layout patch 89, so that any setting items can be moved simultaneously like a single window. This allows the user to intuitively and easily customize the user interface for setting.

Note that the processing performed when the region of the setting patch is determined is not limited. The setting item displayed in the region of the setting patch may be determined in association with a change in the area of the region of the setting patch. For example, when the area of the region of the setting patch is changed to 50%, the area of the setting item may also be determined to 50% at the same time.

Figure 18A:
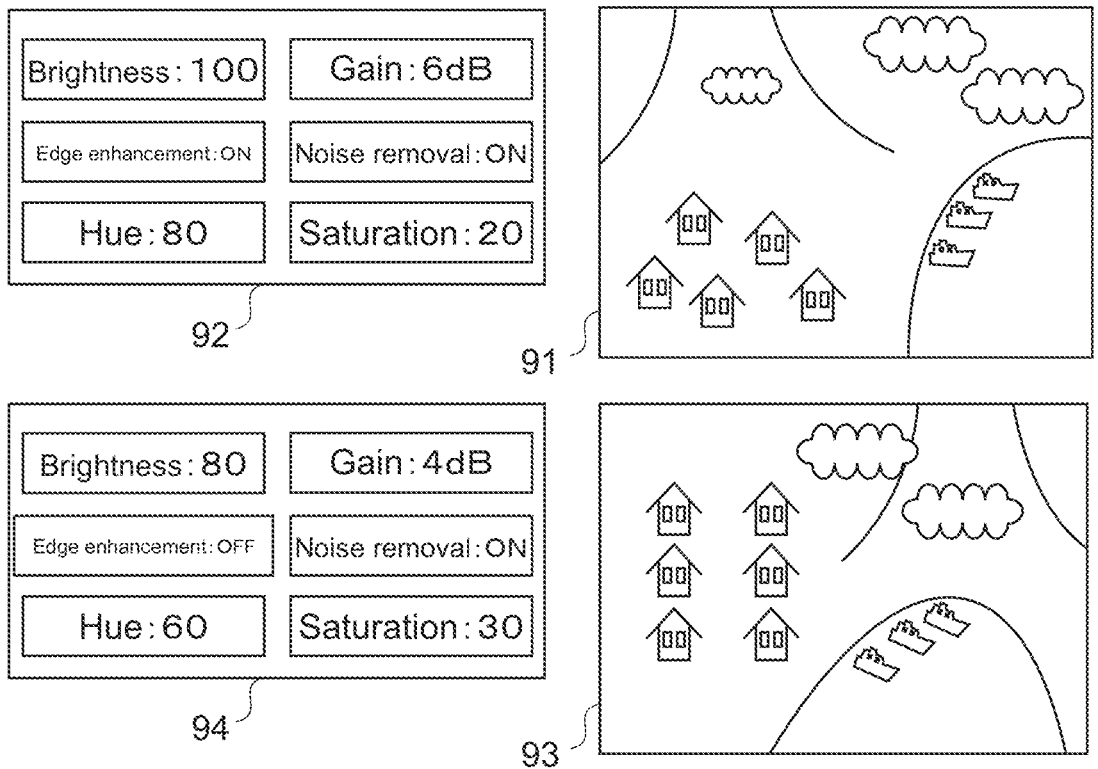
FIGS. 18A and 18B are schematic diagrams showing attachment performed on different setting patches.
Figure 18B:
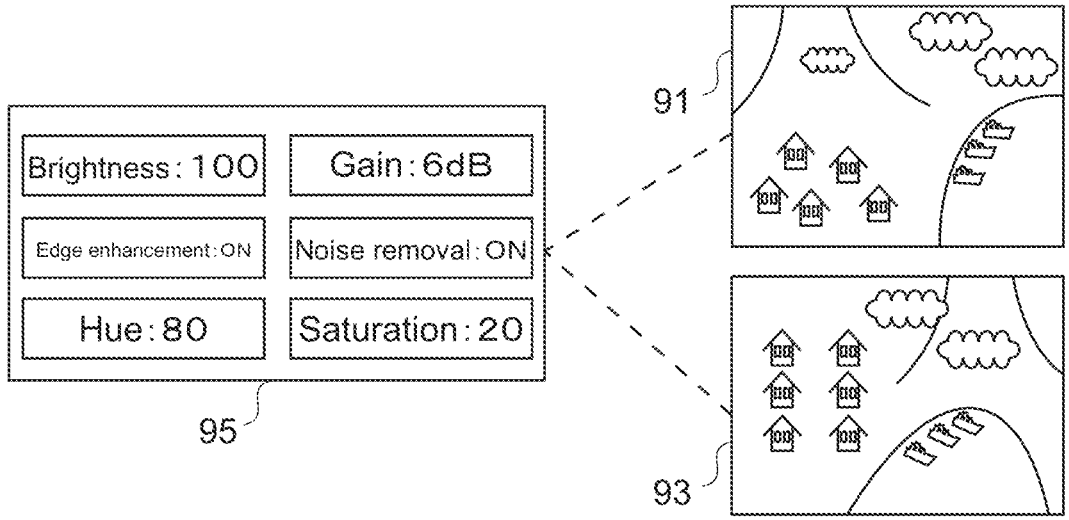

FIGS. 18A and 18B are schematic diagrams showing attachment performed on different setting patches. FIG. 18A is a schematic diagram showing setting patches before attachment is performed. FIG. 18B is a schematic diagram showing setting patches after attachment is performed.

As shown in FIG. 18A, a setting patch 92 corresponding to an image input patch 91 is displayed, and a setting patch 94 corresponding to an image input patch 93 is displayed. In this embodiment, the setting items displayed in the regions of the setting patch 92 and the setting patch 94 are set to be the same. Specifically, brightness, gain, edge enhancement, noise removal, hue, and saturation are set as the setting items.

As shown in FIG. 18B, when the user gives an instruction to perform attachment on the setting patch 92 and the setting patch 94, a setting patch 95 corresponding to the image input patch 91 and the image input patch 93 is generated.

The set value of the setting patch 95 subjected to the attachment is replaced with the set value of the parent patch. When the set value of the setting patch 95 is changed, the set values corresponding to all the setting patches subjected to the attachment are simultaneously changed to the same value.

For example, when the setting item of the edge enhancement of the setting patch 92, which is the parent patch, is ON and the setting item of the edge enhancement of the setting patch 94, which is the child patch, is OFF, if the setting patch 92 and the setting patch 94 are subjected to attachment, the setting item of the edge enhancement is ON.

This makes it possible to easily set and change the set values of different patches collectively under the same condition.

As described above, in the image processing apparatus 20 according to this embodiment, the display of a patch capable of designating a region with respect to image data is controlled. The processing associated with the patch is executed on the region of the patch designated by the patch. The processing associated with the parent patch and the child patch is executed on the region where the regions designated by the parent patch and the child patch overlap with each other. Further, if there is an overlap region, the child patch is moved in conjunction with the movement of the parent patch. This makes it possible to exhibit high usability.

When a tool capable of performing image processing or the like is used, any range is first selected, and then image processing or analysis processing is designated in a menu or the like. In this case, only one processing can be performed at the same time, and in order to execute a plurality of image processing, it is necessary to manually select image processing or to execute a script describing a procedure.

In this regard, in the present technology, any image processing or image analysis is performed by pasting a patch whose function is defined in advance on an image. In addition, a plurality of patches is pasted in any size (area) in any place on an image.

When the arranged patches overlap with each other, image processing or image analysis is performed using an image output to the parent patch as an input, and the processing result is displayed in the region of the child patch. In this manner, the patches overlap with each other, so that the image processing is stacked to form a pipeline of the image processing.

In addition, when the parent patch of the overlapping patches is moved, the child patch is moved simultaneously, and thus the image processing is performed on any region while the pipeline of the image processing is retained.

Thus, overlapping of the patches makes it possible to easily intuitively construct the pipeline of the image processing, so that the time required for setting can be shortened. Further, since only the region to be evaluated is subjected to image processing, processing speed can be increased.

Further, moving the overlapping parent patch and child patch as they are makes it possible to intuitively change the region while maintaining the pipeline of the image processing, so that the efficiency of the evaluation can be improved. Furthermore, since different image processing pipelines are formed in different portions of the image, evaluation can be performed in parallel, thereby making it possible to improve the efficiency of evaluation.

Furthermore, since the analysis result is displayed in the region of the patch, it is possible to intuitively confirm the tendency of the analysis on the image.

Other Embodiments

The present technology is not limited to the embodiment described above and can provide various other embodiments.

In the embodiment described above, specific image processing and image analysis have been performed on the image data within the region designated by the patch. The present technology is not limited to this, and the information associated with the image data may be searched for in the region designated by the patch.

Figure 19:
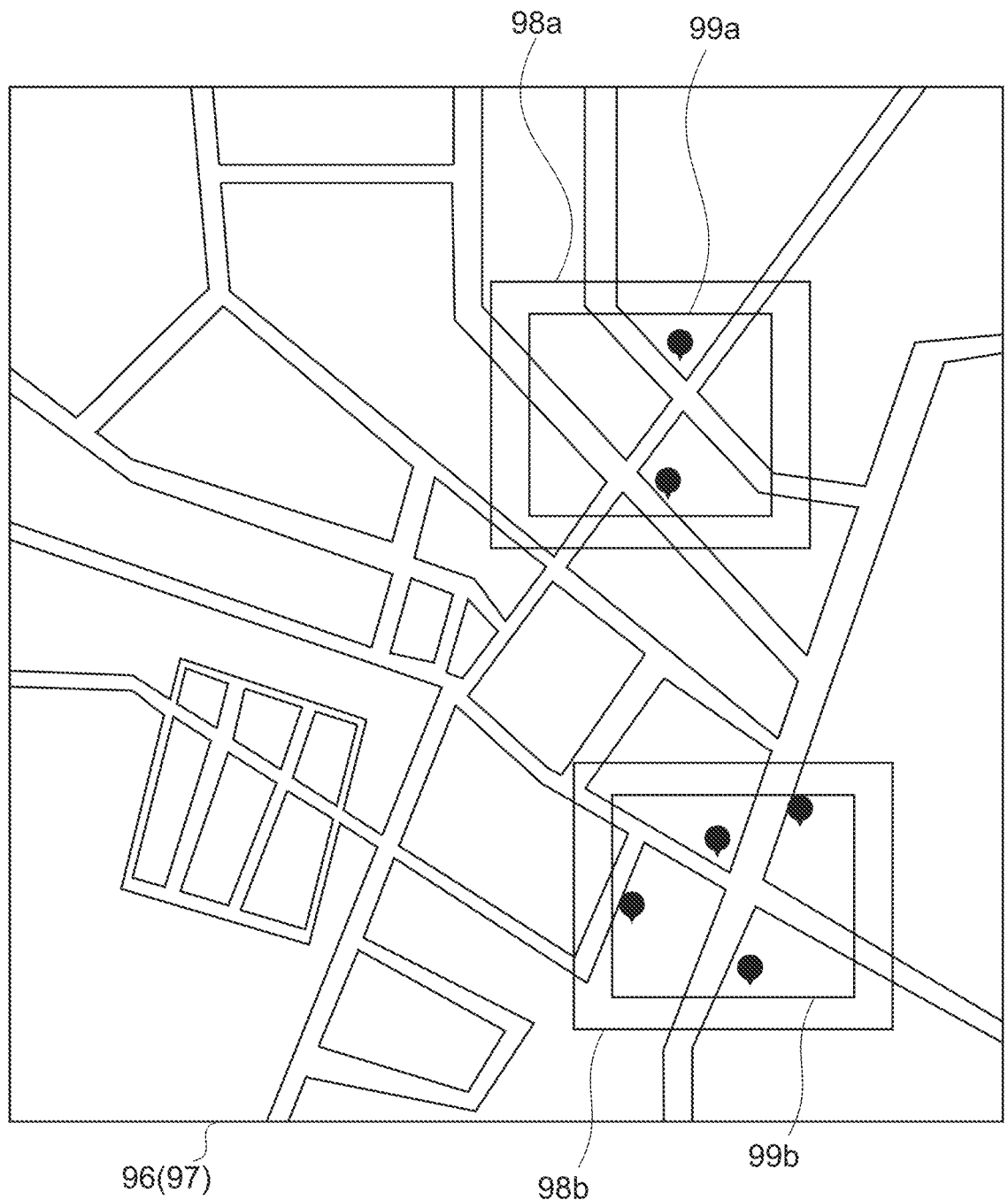
FIG. 19 is a schematic diagram showing a case where patches for performing search processing on image data showing a map are arranged.

FIG. 19 is a schematic diagram showing a case where patches for performing search processing on image data showing a map are arranged.

In FIG. 19, a DB having specific information is linked to coordinates of image data 96 showing a map. In this embodiment, the DB has information relating to buildings such as restaurants and the like linked to the coordinates of the image data 96. For example, the DB may have information such as whether the building is a restaurant handling Chinese food or Italian food or whether smoking is allowable or not. Note that the information included in the DB is not limited. For example, the DB may have information such as whether it is located within 5 minutes from the station or whether there is a parking lot.

Further, a plurality of search patches is arranged on an image input patch 97 on which the image data 96 is displayed. The search patch is a patch for searching for a search target determined by the processing selecting unit 3 with respect to the coordinates within the designated region. In this embodiment, a search patch 98a and a search patch 98b for searching for a restaurant where smoking is allowable, and a search patch 99a and a search patch 99b for searching for a restaurant handling Chinese food are arranged on the image input patch 97.

As shown in FIG. 19, the search patch 99a is arranged on the search patch 98a. Further, the search patch 99b is arranged on the search patch 98b. That is, the processing executing unit 7 searches the DB linked to the coordinates of the image data 96 for a restaurant in which smoking is allowable and which handles Chinese food in the region where the search patch is arranged.

As a result, the patches having the respective search conditions are superimposed, and thus it is possible to search for a store that meets the conditions in the designated region. As a result, since the search is performed only within the region designated by the patch, a high-speed response can be provided by reducing the amount of communication with the server. Further, the comparison can be easily carried out by displaying a plurality of search results on a piece of image data.

Note that the search conditions of the search patch are not limited. For example, a restaurant that does not handle Chinese food or the like may be a search target. Further, the processing of alias and attachment for the search patch is also possible.

In the embodiment described above, the image processing is performed on only part of the image data. The present technology is not limited to this, and the image processing may be performed on the entire image data. For example, when the image processing is performed on a photograph, a moving image, or the like, the image processing may be performed on the entire image data after the image processing is performed on only part of the region.

This makes it possible to intuitively perform multiple types of image processing on only an object of interest of the user. Further, since the image processing is performed on part of the image data, it is possible to imagine the final finish and to prevent the image processing of the entire image data from being performed again. Further, since the image processing is partially performed, the load of the image processing is reduced, so that the amount of communication can be reduced, and a high-speed response can be performed.

In the embodiment described above, when the regions designated by the patches overlap, the processing of both patches is executed. The present technology is not limited to this, and any logical operation may be performed on the overlap region. For example, when a patch A on which processing A is executed and a patch B on which processing B is executed overlap, the processing A or the processing B may be executed. That is, the processing may be executed by various logical operations such as OR and XOR in addition to the AND condition.

In the embodiment described above, attachment is performed as one of the means for improving the processing speed. The means for improving the processing speed is not limited. For example, when the image processing patch is moved, the processing result before the movement and the processing result after the movement are the same as the processing result of the portion where the region of the image processing patch before the movement and the region of the image processing patch after the movement overlap.

For example, it is assumed that a colored image processing patch is arranged on an image input patch displaying a monochrome image. In this case, a color image is displayed at a portion overlapping in the region of the colored image processing patch before and after the movement, regardless of before or after the movement.

That is, at the time of moving the image processing patch, image processing is performed only on the difference between the regions before and after the movement, and the processing result of the overlap region is copied as the processing result before the movement. This makes it possible to improve the processing speed by reducing the processing amount of the image processing.

In the embodiment described above, the image processing or the image analysis is performed in a state in which the patches are completely included. The present technology is not limited to this, and the image processing or the image analysis may be performed even when some regions of the patches overlap with each other. Similarly, even when some regions of three or more patches overlap, processing defined for each patch may be executed.

In addition, in the non-overlap region of the patches in which some regions overlap with each other, the processing associated with each patch may be processed in parallel. For example, noise removal image processing and edge enhancement image processing may be performed using the image data output from an image input patch as an input.

In the embodiment described above, when the entire region of the child patch overlaps the region of the parent patch, the child patch is moved in conjunction with the movement of the parent patch. The present technology is not limited to this, and in the case where a part of the region of the child patch overlaps with a part of the region of the parent patch, the child patch may be moved in conjunction with the movement of the parent patch while the positional relationship between the parent patch and the child patch is maintained.

In the embodiment described above, the attachment and alias of the image processing patch and the image analysis patch have been performed. The present technology is not limited to this, and an alias in which an image input patch is copied may be displayed. Further, aliases in which image input patches are copied may be subjected to attachment.

In the embodiment described above, the patches and aliases have been displayed in a rectangular shape. The present technology is not limited to this, and the shape of the region of the patch may be arbitrarily determined. For example, a patch having a region along the contour of a particular object displayed in the image data may be displayed.

Each of the image data output apparatus 18, the display apparatus 19, and the image processing apparatus 20 may be formed individually. Alternatively, a plurality of apparatuses may be integrally formed. For example, the image data output apparatus 18 and the image processing apparatus 20 may be integrally formed, or the display apparatus 19 and the image processing apparatus 20 may be integrally formed. Further, the image data output apparatus 18, the display apparatus 19, and the image processing apparatus 20 may be integrally formed. In addition, any apparatus configuration may be adopted as the information processing apparatus according to the present technology.

The information processing method and the program according to the present technology may be performed, and the information processing apparatus according to the present technology may be constructed, by linking a computer mounted on a communication terminal with another computer capable of communicating via a network or the like.

That is, the information processing method and the program according to the present technology can be performed not only in a computer system formed of a single computer, but also in a computer system in which a plurality of computers operates cooperatively. Note that, in the present disclosure, the system refers to a set of components (such as apparatuses and modules (parts)) and it does not matter whether all of the components are in a single housing. Thus, a plurality of apparatuses accommodated in separate housings and connected to each other through a network, and a single apparatus in which a plurality of modules is accommodated in a single housing are both the system.

The execution of the information processing method and the program according to the present technology by the computer system includes, for example, both a case in which the determination of the processing, the execution of the processing, the generation of the patch image, and the like are performed by a single computer; and a case in which the respective processes are performed by different computers. Further, the execution of each process by a predetermined computer includes causing another computer to perform a portion of or all of the process and obtaining a result thereof.

In other words, the information processing method and the program according to the present technology are also applicable to a configuration of cloud computing in which a single function is shared and cooperatively processed by a plurality of apparatuses through a network.

The respective configurations of the instruction receiving unit, the processing selecting unit, the processing executing unit, the patch image generating unit, and the like; the control flow of the communication system; and the like described with reference to the respective figures are merely embodiments, and any modifications may be made thereto without departing from the spirit of the present technology. In other words, for example, any other configurations or algorithms for purpose of practicing the present technology may be adopted.

Note that the effects described in the present disclosure are merely illustrative and not restrictive, and other effects may be obtained. The above description of a plurality of effects does not necessarily mean that these effects are simultaneously exhibited. It means that at least one of the above-described effects can be obtained depending on the conditions and the like, and of course, there is a possibility that an effect not described in the present disclosure can be exhibited.

At least two of the features among the features of the embodiments described above can also be combined. In other words, various features described in the respective embodiments may be combined discretionarily regardless of the embodiments.

Note that the present technology may also take the following configurations.

(1) An information processing apparatus, including:
a display control unit that controls display of a designation image capable of designating a region with respect to a target image; and
a processing executing unit that executes processing associated with the designation image on a designated region designated by the designation image, in which
the processing executing unit executes, on an overlap region in which a first designated region designated by a first designation image and a second designated region designated by a second designation image overlap with each other, first processing associated with the first designation image and second processing associated with the second designation image, and
the display control unit moves the second designation image in conjunction with movement of the first designation image when the overlap region exists.

(2) The information processing apparatus according to (1), in which
the display control unit moves the second designation image in conjunction with the movement of the first designation image when an entirety of the second designated region is the overlap region.

(3) The information processing apparatus according to (1) or (2), in which
the display control unit moves the second designation image in conjunction with the movement of the first designation image while maintaining a positional relationship between the first designation image and the second designation image.

(4) The information processing apparatus according to any one of (1) to (3), in which
the display control unit simultaneously moves the first designated region image and the second designated region image when an entirety of the first designated region and an entirety of the second designated region are the overlap regions.

(5) The information processing apparatus according to any one of (1) to (4), in which
the display control unit moves the second designated region image independently of the first designated region image except when an entirety of the first designated region and an entirety of the second designated region are the overlap regions.

(6) The information processing apparatus according to any one of (1) to (5), further including
a receiving unit that receives an instruction of a user, in which
the display control unit synthesizes, on the basis of the received instruction of the user, the first designation image and the second designation image such that an entirety of the first designated region and an entirety of the second designated region are the overlap regions, and controls display of the synthesized first designation image and second designation image as a synthesized designation image that designates the overlap region and is associated with the first processing and the second processing.

(7) The information processing apparatus according to any one of (1) to (6), further including
a receiving unit that receives an instruction of a user, in which
the display control unit displays, on the basis of the received instruction of the user, information indicating a position of the designation image with respect to the target image.

(8) The information processing apparatus according to (7), in which
the information indicating the position of the designation image with respect to the target image is an entire image of the target image displayed with reference to the position of the designation image.

(9) The information processing apparatus according to any one of (1) to (8), in which
the processing executing unit executes the first processing by using data related to the overlap region as an input, and executes the second processing by using a result of the first processing as an input.

(10) The information processing apparatus according to any one of (1) to (9), in which
the processing executing unit executes each of the first processing and the second processing by using data related to the overlap region as an input.

(11) The information processing apparatus according to any one of (1) to (10), in which
the display control unit displays, when execution of the second processing using a result of the first processing as an input is impossible, information indicating that the execution of the second processing is impossible.

(12) The information processing apparatus according to any one of (1) to (11), in which
the display control unit cancels, when execution of the second processing using a result of the first processing as an input is impossible, linkage of movement of the second designation image with the movement of the first designation image.

(13) The information processing apparatus according to any one of (1) to (12), in which
the display control unit displays a processing result image based on the processing associated with the designation image on the designated region.

(14) The information processing apparatus according to (13), in which
the processing associated with the designation image includes at least one of output of image data of the designated region, image processing for the designated region, or analysis processing for the designated region.

(15) The information processing apparatus according to (14), in which
the processing result image includes at least one of an image of the designated region, an image of the designated region after the image processing, or an image including a result of the analysis processing.

(16) The information processing apparatus according to (6), in which
the display control unit displays a processing result image based on the processing associated with the designation image on the designated region, and
the processing result image corresponding to the synthesized designation image is the processing result image based on the second processing associated with the synthesized designation image.

(17) The information processing apparatus according to any one of (13) to (16), in which
the display control unit displays a copied image that is an image in which the processing result image is copied.

(18) The information processing apparatus according to (17), in which
the processing executing unit executes the processing associated with the designation image on the designated region designated by the designation image, using the copied image as the target image.

(19) An information processing method executed by a computer system, the method including:
executing first processing and second processing on an overlap region in which a first designated region and a second designated region overlap with each other, the first designated region being designated by a first designation image capable of designating a region with respect to a target image, the second designated region being designated by a second designation image capable of designating a region with respect to the target image, the first processing being associated with the first designation image, the second processing being associated with the second designation image; and
controlling, when the overlap region exists, display of the first designation image and the second designation image such that the second designation image is moved in conjunction with movement of the first designation image.

(20) A program causing a computer system to execute the steps of:
executing first processing and second processing on an overlap region in which a first designated region and a second designated region overlap with each other, the first designated region being designated by a first designation image capable of designating a region with respect to a target image, the second designated region being designated by a second designation image capable of designating a region with respect to the target image, the first processing being associated with the first designation image, the second processing being associated with the second designation image; and
controlling, when the overlap region exists, display of the first designation image and the second designation image such that the second designation image is moved in conjunction with movement of the first designation image.

(21) The information processing apparatus according to any one of (1) to (18), further including
a receiving unit that receives an instruction of a user, in which
the display control unit changes a position and a size of the designation image on the basis of the received instruction of the user.

REFERENCE SIGNS LIST 1 instruction receiving unit
4 designated region determining unit
7 processing executing unit
9 patch image generating unit
10 image output unit
18 image data output apparatus
19 display apparatus
20 image processing apparatus
31 noise removal patch
32 edge enhancement patch
33 low-pass filter patch
34 histogram analysis patch
35 S/N analysis patch
36 statistical analysis patch
41 alias
100 image processing system

The invention claimed is:

1. An information processing apparatus, comprising:
a display control unit configured to control display of a designation image, wherein the designated image corresponds to a specific region with respect to associated with a target image; and
a processing executing unit configured to:
execute, on an overlap region in which a first designated region corresponding to a first designation image overlaps with a second designated region corresponding to a second designation image, a first process associated with the first designation image and a second process associated with the second designation image, wherein
the display control unit is further configured to:
move, based on the overlap region, the second designation image in conjunction with a first movement of the first designation image; and
independently move the second designation image and the first designation image except based on each of an entirety of the first designated region and an entirety of the second designated region is the overlap region.

2. The information processing apparatus according to claim 1, wherein
the display control unit is further configured to move the second designation image in conjunction with the first movement of the first designation image based on the entirety of the second designated region is the overlap region.

3. The information processing apparatus according to claim 1, wherein
the display control unit is further configured to move the second designation image in conjunction with the first movement of the first designation image based on a constant positional relationship between the first designation image and the second designation image.

4. The information processing apparatus according to claim 1, wherein
the display control unit is further configured to simultaneously move the first designation image and the second designation image based on each of the entirety of the first designated region and the entirety of the second designated region is the overlap region.

5. The information processing apparatus according to claim 1, further comprising a receiving unit configured to receive an instruction of a user, wherein the display control unit is further configured to:
   synthesize, based on the received instruction of the user, the first designation image and the second designation image such that each of the entirety of the first designated region and the entirety of the second designated region is the overlap region; and
   control display of the synthesized first designation image and the synthesized second designation image as a synthesized designation image, wherein the synthesized designation image designates the overlap region and is associated with the first process and the second process.

6. The information processing apparatus according to claim 5, wherein
   the display control unit is further configured to display, based on the received instruction of the user, information that indicates a position of the designation image associated with the target image.

7. The information processing apparatus according to claim 6, wherein
   the information corresponds to an entire image of the target image displayed with reference to the position of the designation image.

8. The information processing apparatus according to claim 1, wherein the processing executing unit is further configured to:
   execute the first process based on data related to the overlap region as an input; and
   execute the second process based on a result of the first process as the input.

9. The information processing apparatus according to claim 1, wherein
   the processing executing unit is further configured to execute each of the first process and the second process based on data related to the overlap region as an input.

10. The information processing apparatus according to claim 1, wherein
    the display control unit is further configured to display, based on the execution of the second process using a result of the first process as an input is impossible, information that indicates that the execution of the second process is impossible.

11. The information processing apparatus according to claim 1, wherein
    the display control unit is further configured to cancel, based on the execution of the second process using a result of the first process as an input is impossible, a linkage of a second movement of the second designation image with the first movement of the first designation image.

12. The information processing apparatus according to claim 1, wherein
    the display control unit is further configured to display a processing result image based on the execution of the first process and the second process.

13. The information processing apparatus according to claim 1, wherein
    each of the first process and the second process corresponds to at least one of output of image data, image processing for the first designated region and the second designated region, or analysis processing for the first designated region and the second designated region.

14. The information processing apparatus according to claim 13, wherein
    the display control unit is further configured to display a processing result image based on the execution of the first process and the second process, and
    the processing result image includes at least one of an image of the first designated region and the second designated region, an image based on the image processing, or an image based on the analysis processing.

15. The information processing apparatus according to claim 12, wherein
    the processing result image corresponding to a synthesized designation image based on the second process.

16. The information processing apparatus according to claim 12, wherein
    the display control unit is further configured to display a copied image that corresponds to a copy of the processing result image.

17. The information processing apparatus according to claim 16, wherein
    the processing executing unit is further configured to execute the first process and the second process based on the copied image as the target image.

18. An information processing method, comprising:
    executing first processing and second processing on an overlap region in which a first designated region and a second designated region overlap with each other, the first designated region corresponding to a first designation image, the second designated region corresponding to a second designation image, the first processing being associated with the first designation image, the second processing being associated with the second designation image; and
    controlling, based on the overlap region, display of each of the first designation image and the second designation image, wherein the second designation image is moved in conjunction with a movement of the first designation image; and
    controlling display of each of the first designation image and the second designation image, wherein the second designation image and the first designation image move independently except based on each of an entirety of the first designated region and an entirety of the second designated region is the overlap region.

19. A non-transitory computer-readable medium having stored thereon, computer-executable instructions which, when executed by a processor of a computer system, cause the processor to execute operations, the operations comprising:
    executing first processing and second processing on an overlap region in which a first designated region and a second designated region overlap with each other, the first designated region corresponding to a first designation image, the second designated region corresponding to a second designation image, the first processing being associated with the first designation image, the second processing being associated with the second designation image; and
    controlling, based on the overlap region, display of each of the first designation image and the second designation image, wherein the second designation image is moved in conjunction with a movement of the first designation image; and controlling display of each of the first designation image and the second designation image, wherein the second designation image and the first designation image move independently except based on each of an entirety of the first designated region and an entirety of the second designated region is the overlap region.

* * * * *